United States Patent
Sanchez

(10) Patent No.: US 11,741,218 B2
(45) Date of Patent: *Aug. 29, 2023

(54) SYSTEM AND METHOD FOR IMPROVING THE SECURITY OF STORED PASSWORDS FOR AN ORGANIZATION

(71) Applicant: STATE FARM MUTUAL AUTOMOBILE INSURANCE COMPANY, Bloomington, IL (US)

(72) Inventor: Kenneth J. Sanchez, San Francisco, CA (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 181 days.

This patent is subject to a terminal disclaimer.

(21) Appl. No.: 17/177,019

(22) Filed: Feb. 16, 2021

(65) Prior Publication Data

US 2021/0182379 A1    Jun. 17, 2021

Related U.S. Application Data

(63) Continuation of application No. 15/976,494, filed on May 10, 2018, now Pat. No. 10,956,560.

(60) Provisional application No. 62/617,905, filed on Jan. 16, 2018, provisional application No. 62/539,892, filed on Aug. 1, 2017, provisional application No. 62/534,068, filed on Jul. 18, 2017, provisional application No. 62/522,678, filed on Jun. 20, 2017.

(51) Int. Cl.
*G06F 21/46* (2013.01)
*H04L 9/06* (2006.01)
*H04L 9/32* (2006.01)
*H04W 12/06* (2021.01)
*H04L 9/40* (2022.01)

(52) U.S. Cl.
CPC ............ *G06F 21/46* (2013.01); *H04L 9/0643* (2013.01); *H04L 9/3226* (2013.01); *H04L 63/083* (2013.01); *H04W 12/06* (2013.01)

(58) Field of Classification Search
CPC ..... G06F 21/46; H04L 9/0643; H04L 9/3226; H04L 63/083; H04W 12/06
See application file for complete search history.

(56) References Cited

U.S. PATENT DOCUMENTS

| | | |
|---|---|---|
| 8,752,148 B1 | 6/2014 | Vipond et al. |
| 9,154,304 B1 * | 10/2015 | Dotan .................. H04L 9/3228 |
| 10,348,504 B2 | 7/2019 | Fox et al. |
| 10,956,560 B1 | 3/2021 | Sanchez |

(Continued)

*Primary Examiner* — Hee K Song
(74) *Attorney, Agent, or Firm* — Faegre Drinker Biddle & Reath LLP

(57) ABSTRACT

A hashed fried password method includes receiving a password value, a global pepper value and fry values; generating a random salt value and selecting a fry value; generating a fried password; and authenticating the user when a hashed fried password value matches a candidate hash. The method may include receiving the fried password and/or salt. A system includes processor and a memory storing instructions that, when executed by the processor cause the system to receive a password value, a global pepper value and fry values; receive a hashed fried password value and salt value; apply a hashing function; and authenticate the user when the hashed fried password value matches a candidate.

21 Claims, 10 Drawing Sheets

(56) References Cited

U.S. PATENT DOCUMENTS

| | | |
|---|---|---|
| 2005/0166263 A1 | 7/2005 | Nanopoulos et al. |
| 2007/0124321 A1 | 5/2007 | Szydlo |
| 2007/0192601 A1 | 8/2007 | Spain et al. |
| 2017/0346797 A1* | 11/2017 | Yedidi .................... H04L 63/14 |
| 2018/0013565 A1 | 1/2018 | Fox et al. |

* cited by examiner

SYSTEM AND METHOD FOR IMPROVING THE SECURITY OF STORED PASSWORDS FOR AN ORGANIZATION

CROSS-REFERENCE TO RELATED APPLICATIONS

This application is a Continuation of Non-Provisional application Ser. No. 15/976,494, entitled "System And Method For Improving The Security Of Stored Passwords For An Organization" filed on May 10, 2018; which itself claims priority to U.S. Provisional Application 62/617,905, entitled "System And Method Of Improving The Security Of Stored Passwords For An Organization" filed on Jan. 16, 2018; U.S. Provisional Application 62/539,892, entitled "System And Method For Improving The Security Of Stored Passwords For An Organization" filed on Aug. 1, 2017; U.S. Provisional Application 62/534,068, entitled "System And Method Of Improving The Security Of Stored Passwords For An Organization" filed on Jul. 18, 2017; and U.S. Provisional Application 62/522,678, entitled "System And Method Of Improving The Security Of Stored Passwords For An Organization" filed on Jun. 20, 2017. The contents of the nonprovisional and provisional applications are incorporated herein in their respective entireties.

TECHNICAL FIELD

The present disclosure is generally directed to improving the security of stored passwords for an organization, and more particularly directed to improving security using techniques for generating and validating salted and peppered hashes.

BACKGROUND

A primary risk of storing user passwords is unauthorized access. For example, an attacker may gain unauthorized access to a password database or repository of an organization and/or an organization's customers and intentionally reveal (i.e., leak) and/or misuse the information. Password information may leak due to negligence or programming error. Such leaks have the potential to severely damage an organization's reputation and/or credibility, and may lead to legal liability, including criminal penalties. Therefore, there is a need for strategies for protecting password information so that the information is resistant to misuse and/or exploitation, even if the information leaks.

In all password-based authentication systems, users' authentic passwords must be available to the method and/or system (e.g., application) performing the authentication and hashing operations, in some form. This necessity implies that if a password-based authentication system is compromised, then the authentic user passwords are also compromised, in some form. The only practical difference between compromised systems may be in the amount of work required by an attacker to convert the given form to the original password. If the passwords in a compromised system are stored in plain text, then no work is required, i.e., an attacker may immediately use them in further illicit activity (e.g., in "credential stuffing" wherein a user's stolen credentials are used to target the user's accounts in other computer systems). On the other hand, various techniques have been devised to add work to hashing, to make using stolen credentials more difficult.

Password hashing is one way that plain text passwords are protected from misuse. In general, hashing functions map input parameters of any size to unique outputs of a fixed size. A hash function's output may also be referred to as a hash or hash value. Hash functions are used to create hashes of passwords by passing the password as a parameter to the hash function and receiving from the hash function a fixed size hash. Obfuscation is one benefit of password hashing, i.e., hashes may appear to the naked eye as random strings of letters and/or digits that are not immediately recognizable as corresponding to any particular input string. Thus, in the event of a security breach, an attacker cannot immediately use hashed password in attacks against other targets.

However, it should be understood that various techniques have been developed for "reversing" hashed passwords. These techniques may include brute force attacks, in which all possible combinations in a space (e.g., 7-character strings) are tested, and pre-computation attacks. In pre-computation attacks, a table of hashes for common passwords is computed in advance, and then the table is searched for stolen hashes. If a match is found, then the attacker has "reversed" the stolen hash and discovered the corresponding password. More complete descriptions of these techniques are described below.

BRIEF SUMMARY

In various applications, a need exists to create and store passwords and/or other authenticating secret keys in a way that is resistant to brute force and/or pre-computation attacks. Passwords may be typically textual strings of characters, symbols, and/or digits. Authentication of users may be performed by checking a provided password against a stored password that may or may not have been hashed using any of a variety of different hashing functions. For example, in the simplest and most insecure instance, a user's plain text password is stored along with a user identifier (e.g., a username and/or other identifier) such that the identifier and password are associated. The user identifier and associated password may be stored in an electronic database or other suitable location. When the user desires to authenticate, the user may provide a user identifier (e.g., such as the username) and a password that are compared (e.g., by an application) to the stored identifier and password. If the provided and stored identifiers and passwords match, then the user is authenticated.

Techniques to frustrate pre-computed hashes may exist, such as salting and peppering. Both are described in more detail below, but neither approach, alone or in combination, may provide sufficient resistance to known attacks, especially if an attacker is determined, clever, and/or has access to large amounts of hardware, in particular computers used for parallel processing. The highly sensitive nature of the data protected by passwords demands techniques that are robust and resistant to brute force and other attacks designed by determined attackers, while avoiding the introduction of unacceptable latency and/or cumbersome steps into the authentication process.

In one aspect, a computer-implemented method for creating a hashed fried password in a computing device may be provided. The method may include (1) receiving a password value of a user; (2) receiving a global pepper value; (3) receiving a set of fry values; (4) generating, via a random number generator, a salt value; (5) selecting at least one fry value from the set of fry values; (6) generating a fried password by combining the password value, the salt value, the global pepper value, and the at least one fry value; (7) applying a hashing function to the fried password to generate a hashed fried password; and (8) authenticating the user when the hashed fried password value appears within a set of candidate hashes. The temporary, random fry value may not be not saved or otherwise permanently stored in a local or remote memory unit to facilitate preventing attacker learning the value of the fry value. The method may include additional, less, or alternate actions, including those discussed elsewhere herein.

In another aspect, a computer-implemented method for creating a hashed fried password at a computing device may be provided. The method may include (1) receiving a password value of a user; (2) receiving a global pepper value; (3) receiving a set of fry values; (4) receiving a hashed fried password value and salt value associated with the user; (5) applying a hashing function to the password value, salt value, global pepper value, and each of the set of fry values to generate a hashed fried password; and (6) authenticating the user when the hashed fried password value appears within a set of candidate hashes. The method may include additional, less, or alternative actions, including those discussed elsewhere herein.

In another aspect, a computer configured to create and use hashed fried passwords may be provided. The computer system may include one or more processors; and/or one or more memories storing instructions that, when executed by the one or more processors, cause the computing system to (1) receive a password value of a user; (2) receive a global pepper value; (3) receive a set of fry values; (4) receive a hashed fried password value and salt value associated with the user; (5) apply a hashing function to the password value, salt value, global pepper value, and each of the set of fry values to generate a set of candidate hashes; and (6) authenticate the user when the hashed fried password value appears within the set of candidate hashes. The computer system may include additional, less, or alternate functionality, including that discussed elsewhere herein.

In another aspect, a computer-implemented method for creating a hashed fried password may be provided. The method may include (1) receiving a first password value of the user; (2) transmitting, to a remote computing device, the first password value of the user; (3) receiving a fry value; (4) storing the fry value securely; (5) receiving a second password value of the user; (6) transmitting, to the remote computing device, the second password value of the user, a pepper value, a salt value, and the securely-stored fry value; (7) receiving authentication information; (8) applying a hashing function a password value including the second password value, the pepper value, the salt value and the securely-stored fry value, to generate a hashed fried password; and (9) authenticating the user when the hashed fried password value appears within a set of candidate hashes. The method may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
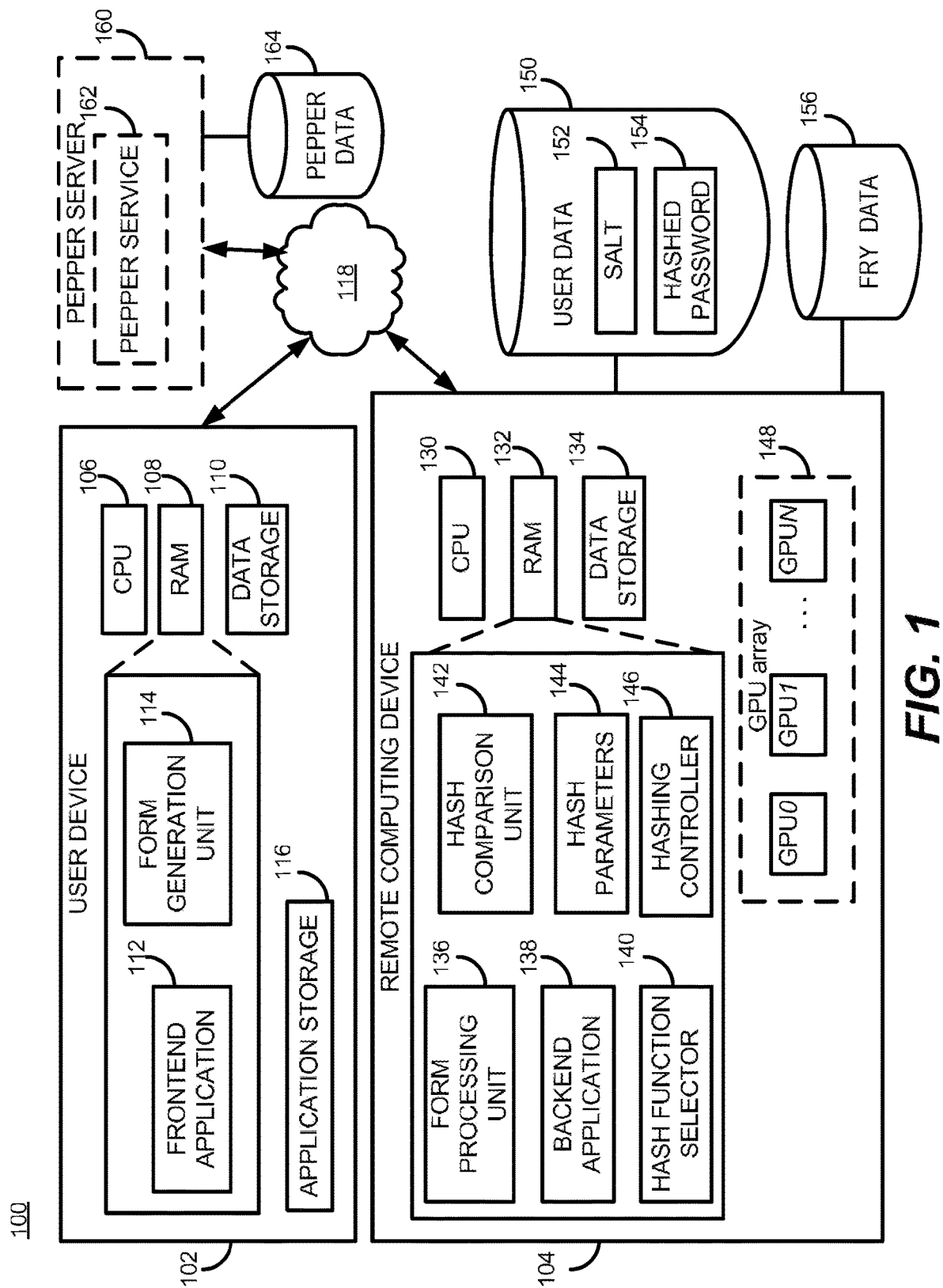
FIG. 1 depicts an exemplary computing environment in which hashed salted, peppered, and fried passwords may be created and authenticated, according to one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The embodiments described herein relate to, inter alia, the hashing and storage of secrets (e.g., passwords) and the authentication of secrets provided by the user against the hashed secret. The systems and techniques described herein may be used, for example, in any system wherein secure storage of password hashes may be implemented, and in any system wherein the authentication of password hashes may be implemented. For example, the methods and systems described herein may be used by a company or other entity for the purpose of hashing a password associated with a user, and later, to authenticate the user on repeat visits. The methods and systems described herein may be used to authenticate a user to any system or service that requires password-based authentication (e.g., a website or mobile application). Methods and systems are described herein not only allow authorized parties to quickly and simply create and authenticate user-provided passwords, but also to create intractable amounts of computational overhead for unauthorized parties seeking to do the same.

More specifically, the embodiments described herein relate to hashing techniques that use a combination of a password, a salt value, a pepper value, and a value chosen at random from a set of fry values. The term "password," as used herein, may be any secret key chosen by a user and known only to the user. It may comprise any number and combination of alphabetic, numeric, or symbolic characters, in any character encoding, and any character case. The same may be said with respect to the composition of the salt value, pepper value, and each respective fry value. Fry values may comprise any set of unique, uniformly-distributed values. For example, fry values may be a range of integer values (e.g., 0-1024 inclusive), a range of hexadecimal values, or strings. It should be appreciated by those skilled in the art that the universe of fry values may comprise any suitable values.

An attacker may attempt a brute-force attack of a password. Generally, brute-force attacks are those in which the hash of every password in a search space is computed and tested against a target hash. For example, the hash of the password "opensesame" may be "d9fb92e3bbe65be1f-1aad4a82eef4567f7a1ebe2cd110c8049b9698be7a70c88".

In a brute force attack, the attacker may decide to search the space of length-10 password combinations containing the lowercase Roman alphabet and the numbers 0-9 (the set [a-z0-9]), yielding a set of 36^10 hash combinations (e.g., aaaaaaaaaa, aaaaaaaaab, etc.). Such attacks are very computationally intensive. The attacker may compute the hash of each combination in the set, and if the attacker finds that one of the computed hashes of a password matches the target hash ("d9fb9 . . . "), then the attacker knows that the corresponding password ("opensesame") matches the password used to compute the target hash.

Advances in parallel computing may enable an attacker executing a brute-force search to attempt billions of guesses per second and "crack" passwords in an ever-decreasing amount of time. Making passwords longer is an effective way to combat brute force attacks because the computational power needed to check passwords increases exponentially with the length of the password string. For example, a length-7 alphanumeric [a-z0-9] password has 36^7 or 78364164096 combinations. Given an off-the-shelf GPU system capable of computing 500 billion hashes per second, all of the 36^7 hashes may be computed in less than one second. However, increasing the length of the password to 12 (36^12 combinations) may increase the amount of time taken to compute all hashes to over 100 days. On the other hand, assuming 500 billion hashes per second, a password of length-20 would likely take billions of years to brute force. Unfortunately, length-20 passwords are impractical because many users are unable or unwilling to use them. In practice much shorter passwords are often used. Increasing entropy (e.g., by including symbols in addition to alphanumerics) may further increase the amount of time required to successfully guess a password in a brute force attack.

Dictionary attacks are a more focused form of brute force attacks, wherein a list of common words and/or phrases may be used rather than every possible combination in a search space. The dictionary used may vary, and may comprise any suitable set of likely values, such as common names, birth dates, sports teams, etc. Dictionary attacks may employ statistical methods to guess passwords that are known to be commonly used based upon analysis of leaked data sets. Dictionary attacks may be more computationally efficient than brute force attacks because they only check a small subset of an entire search space, however, the cost of this efficiency is coverage. Because they do not search all strings of a given length, dictionary attacks are not as comprehensive as brute force searching. For example, in the above example, the chosen password ("opensesame") would almost certainly be found quickly by a dictionary attack. However, a 10-letter random passphrase might take longer or might not be found at all. It should be understood that brute-force and dictionary attacks may be hybridized, for example all words in a dictionary followed by one or more digits may be tested (e.g., "opensesame0", "opensesame1", etc.).

Attackers may also attempt pre-computation attacks. In general, pre-computation attacks are those in which an attacker who is in possession of one or more stolen password hashes creates a large lookup table, sometimes known as a rainbow table, that contain chains of pre-computed hashes that may be quickly searched to reverse a hashed password to the original password. Pre-computation attacks differ from brute force and dictionary attacks in that all of the work of computing hashes must be done at the outset. Therefore, large amounts of storage space are needed, i.e., all candidate hashes must be computed and stored before any target hash may be checked for a match. In contrast, in a brute-force attack may stop computation as soon as the target hash is found, and may therefore require less computation time.

Salted passwords may be used to combat pre-computation attacks. A salt value, or simply salt, is a random string that is unique to each password stored in an authentication system. Herein, "random" indicates a string obtained via a random number generator, pseudo-random number generator, or any other source of randomness. A salt may be appended or prepended to a password before the password is hashed, yielding a salted password. Alternately, the password may be modified by the addition of the salt to yield a new value that will be hashed. Salts complicate pre-computation attacks by causing all instances of a single hashed password to differ from one another. That is, even if two users select the same password, the hashes of the password, along with the respective salts, will differ.

For example, given the password "PasswordABC", two salted passwords corresponding to two users may be generated as "PasswordABC$2BjQOnt8iEONp/QlJwU+7g" and "PasswordABC$QYhttnOFGZlcK3BnEdq7OA", wherein the dollar sign ($) is used as a delimiting character between the password and the salt in each instance. Hashing the two salted passwords may yield, respectively, the hashes "d1f56356f5331c52eedbe97ae3ae329d40bc1cbf2ec2bf1-ffd2bb46377690ca1" and "a9bee5af0cbb5a1d5e700cdbb-aaab6812367effb39e8997311b2ef98285ce2ac".

The first salt ("2BjQOnt8iEONp/QlJwU+7g") and corresponding hash (beginning "d1f5") may be stored in association with the first user, and the second salt ("QYhttnOFGZlcK3BnEdq7OA") and corresponding hash (beginning "a9bee") in association with the second user. Later, the user may desire to authenticate. To do so, the system may retrieve the salt and hashed password associated with the user. The system may then compute the hash of the concatenation of a user-provided password and the retrieved salt. If the hash of the concatenated password and salt match the hashed password associated with the user, the user may be authenticated. Depending on the conventions of the system, a delimiting character may or may not be used, but any such use must be consistent—the addition or removal of even a single additional character to/from the hashed string will produce an entirely different hash value.

In the foregoing example, the hashes differ ("d1f5 . . . " and "a9bee"), whereas without salts, they would be identical (hash to the same value). Therefore, the decision to salt passwords greatly diminishes the value of pre-computation attacks because to compute and store a pre-computed hash for every possible password value and salt value combination and may be computationally difficult.

Nonetheless, salts may not be an airtight technique because if an attacker knows a hashed salted password, and the associated salt (which the attacker is likely to know in a leaked-password-database scenario, given that a corresponding salt value and password value are typically stored alongside one another) then the attacker may append the salt to every possible password in a search space, and compute the hash of each of them. This may generate a large number of hashes, and may be time-consuming, but by focusing an attack in this way, a determined attacker may be able to successfully reverse a hashed salted password. Therefore, both brute force and dictionary attacks may be used against salted passwords.

Peppering is an additional technique that may be used to add a further layer of security to password hashing. In peppering, a pepper value (e.g., a secret key) that is known only to the company or entity performing the hashing is appended to the password, in addition to the salt, prior to hashing. Unlike salts, which are generated on a per-password basis, pepper values are often global keys (i.e., values that are reused to hash all passwords in a system). "Secret" in this context means that only the service provider knows the pepper value. Thus, to authenticate a hashed salted peppered password may require the password, the corresponding salt, and the pepper. The pepper value may be stored securely on a system that is isolated from the system performing the authentication, and only accessible from the authentication system using secured means. In this way, if (for example) a table of user identifiers, passwords, and salts is revealed, through negligence, or due to a criminal act, the hashed salted peppered passwords will not be reversible, due to the attacker missing the pepper key.

If pepper values are not compromised, then the hashes they are used to produce are very secure, for the same reason that long passwords are secure. For example, a pepper comprising a 256-bit binary key has $2^{256}=1.2\times10^{77}$ possible combinations. Checking only half of the possible secret keys via brute force, at 500 billion hashes per second, would take approximately 14 billion years.

However, peppering—like salting—may have limitations and potential vulnerabilities. As discussed above, the password hashing system must have access to the information used to perform the hash creation and authentication functions, for example when a user signs up for an account or is later authenticated using a provided password. Therefore, the password hashing system needs access to the pepper value, and must either store, or regularly have access to, the pepper value. Consequently, if an attacker gains access to the password hashing system, the attacker may be able to access the pepper value by looking on disk or in memory. Pepper values provide strong mathematical guarantees, but are not practically effective because they rely on only a single secret value. Therefore, the pepper technique is of limited value in many circumstances, in particular if system intrusion or compromise occurs or is likely to occur.

Slow hashing functions are another tool for mitigating password attacks. Slow hashing functions, as the name implies, are hashing functions that are designed to run slowly. The hashes they produce can only be created using slow means (i.e., there are no shortcuts to creating slow hashes). For example, a hashing function may contain a cost function that adds computation time to the hashing function. The added time has no purpose except intentionally delaying the amount of time that is required to generate (and thus, to crack) a hash. The added computation time lowers the number of guesses that can be made (e.g., in a brute-force attack) in a given period amount of time. For example, the amount of time to compute a slow hash may be increased from 0.1 milliseconds to 10 milliseconds. That increase may correspond to a net increase in amount of time required to guess a password from 10 days to 1000 days.

However, slow hashing functions are indiscriminately slow, in that they are slow for everyone. Attackers must wait, as must legitimate users. In high-volume websites, adding computation time to the authentication hashing function may mean that a user has to wait to sign up or log in, and may decide to give up. Web developers measure site latencies in milliseconds, so a delay of 1 second may not be acceptable performance. Web analytics research has demonstrated that delays of milliseconds may impact online sales, and the addition of slow hashing functions may force customers into the arms of one's competitors.

Further, there is a low ceiling to the amount of time that can be added as a cost parameter to slow hashing functions. For example, if the operator of a website caused a slow hashing function to spend 60 seconds to hash a password, the operator would have created a very effective defense against brute force attacks by greatly slowing down the number of hashes that can be computed per second. However, few users would wait for the service. Attackers become more efficient all the time, for example by parallelizing attacks against services that use slow hashing functions, but there is a hard cap on the amount of cost that can be added. As such, slow hashing functions are of limited use on their own.

In one embodiment, hashed salted peppered passwords are fried, to create hashed salted peppered fried passwords that are resistant to brute force, dictionary, and pre-computation attacks by unauthorized parties, yet that may be computed to quickly authenticate authorized parties. Herein, the term "hashed fried password" is defined to refer to the value returned by hashing a password, salt, pepper, and fry value. Herein "hashed fried password" is synonymous with a hashed salted peppered fried password.

Further, although some embodiments may include a salt and pepper, and may provide ideal defense against attackers, it should be appreciated that in some embodiments, a salt and pepper are omitted in favor of methods and systems that hash only a fry value in conjunction with secret data. In such embodiments, fry values may be generated in such a way as to frustrate attempts by attackers to guess or predict the fry values, as discussed above.

Exemplary Computing Environment

FIG. 1 depicts an exemplary computing environment 100 in which hashed salted, peppered, and fried passwords may be created and/or authenticated. The depicted embodiment includes user device 102 and server device 104 that may be communicatively coupled by network 118. User device 102 may be a laptop computer, desktop computer, tablet, smartphone, wearable device, or any other suitable type of personal and/or mobile computing device. Mobile computing devices generally include smart phones, tablets, wearable devices, and other portable electronics. Alternatively, user device 102 may be a relatively "dumb" node or terminal, such as an IoT device with little memory and/or processing power. Network 118 may be a single communication network, or may include multiple communication networks of one or more types (e.g., one or more wired and/or wireless local area networks (LANs), and/or one or more wired and/or wireless wide area networks (WANs) such as the Internet). User device 102 may contain CPU 106, which may comprise one or more processors or cores. User device 102 may additionally comprise RAM 108 (i.e., memory) and data storage 110 (i.e., persistent storage). Generally, CPU 106 may be configured to execute software instructions stored in application storage 116, and may load data and/or instructions into RAM 108. RAM 108 may comprise frontend application 112 and form generation unit 114, both of which may access data storage 110. User device 102 may also comprise application storage 116. Application storage 116 may contain software instructions used to process user input. User device 102 may include biometric sensor components (e.g., a fingerprint reader) that may be used for authentication and hashing purposes.

Remote computing device 104 may comprise components that are substantially similar to those of user device 102. For example, remote computing device 104 may comprise CPU 130, which may comprise one or more processors or cores, RAM 132, and data storage 134. RAM 132 may comprise form processing unit 136, backend application 138, hash function selector 140, hash comparison unit 142, hash parameters 144, and hashing controller 146. Each of references 136-146, inclusive, may read data from, and write data to, data storage 134.

Remote computing device 104 may contain GPU array 148, which may comprise individual GPU cores $GPU_0$-$GPU_n$. Although depicted as being located within remote computing device 104, GPU array 148 may be remotely located and communicatively coupled to remote computing device 104 and/or other components via network 118. Remote computing device 104 may correspond to user data 150, which may comprise salt 152 and hashed password 154. The purpose of user data 150 is to maintain an association between an identifier identifying a user, and that user's respective salt and hashed password. Salt 152 and hashed password 154 may be represented in columns in a table in an electronic database (e.g., in a user table). For example, one row of such a table may correspond to a single user or individual authenticated credential of the frontend application 112 and may contain other, corresponding profile information (e.g., email address, age, mailing address, etc.). In one embodiment, a single user may be associated with more than one member or row of the user data 50.

Remote computing device 104 may correspond to fry data 156, which may be an electronic database comprising a set of fry values. Fry values may be any set of unique, uniformly distributed random values. As an example, a fry value may be a randomly generated number. As another example, a fry value may be a number selected randomly from a finite set of known values.

Pepper server 160 may comprise pepper service 162. Pepper service 162 may comprise an application programming interface (API) endpoint (e.g., a REST or SOAP API) and may accept protocol requests (e.g., HTTP), including request parameters (e.g., including a query token, or a username and password). Requests to the pepper service 162 may be encrypted and/or require authentication. Pepper server 160 may correspond to pepper data 164, and may contain substantially similar basic components as do user device 102 and remote computing device 104 (e.g., a CPU and RAM). Pepper server 160 may be communicatively coupled to other components via network 118. Although depicted as being located within a separate component, namely pepper server 160, pepper service 162 may be located within remote computing device 104 or within another component.

Figure 3:
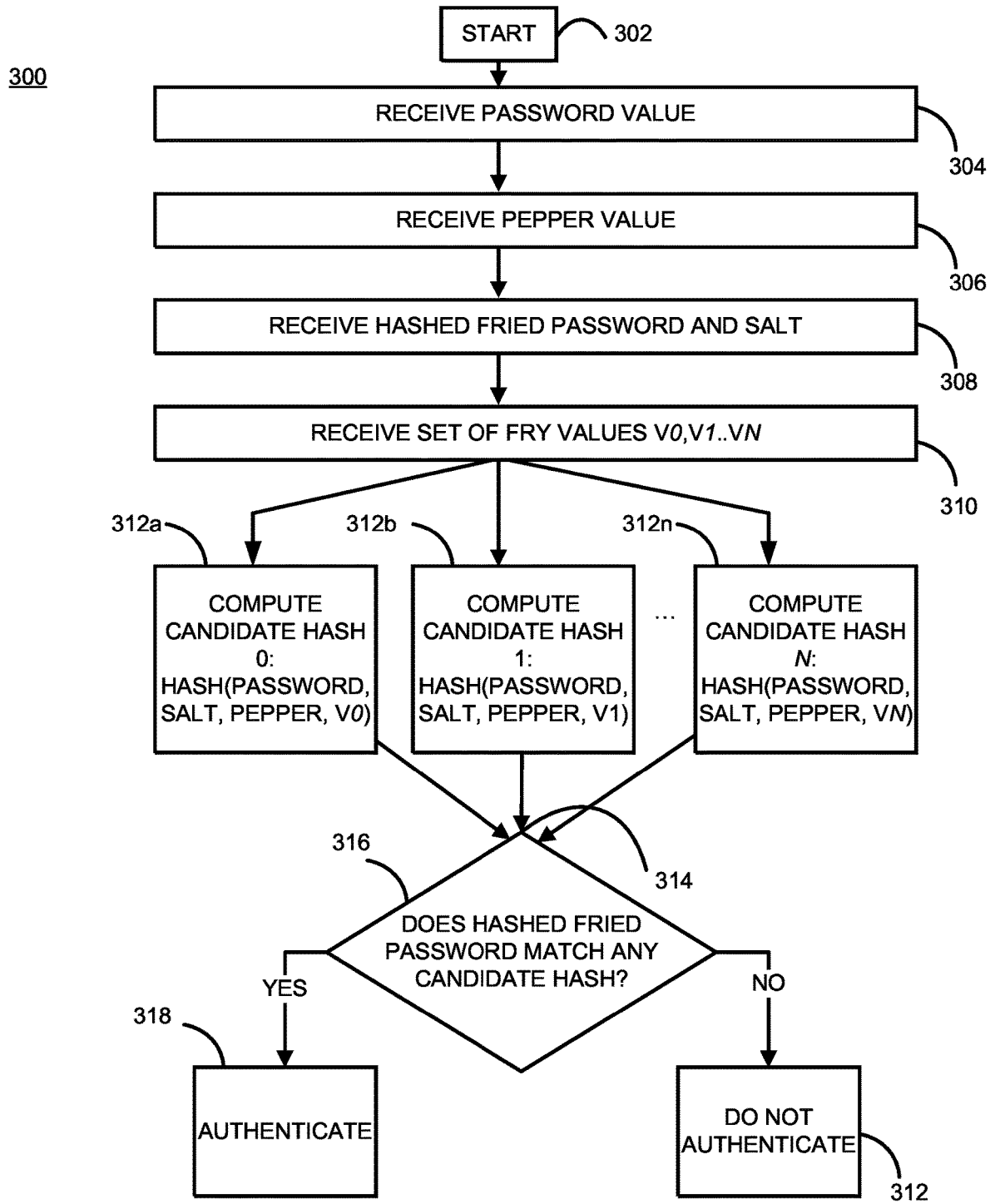
FIG. 3 depicts a flow diagram of an exemplary computer-implemented method by which a password provided by a user may be authenticated, according to one embodiment.
Figure 4:
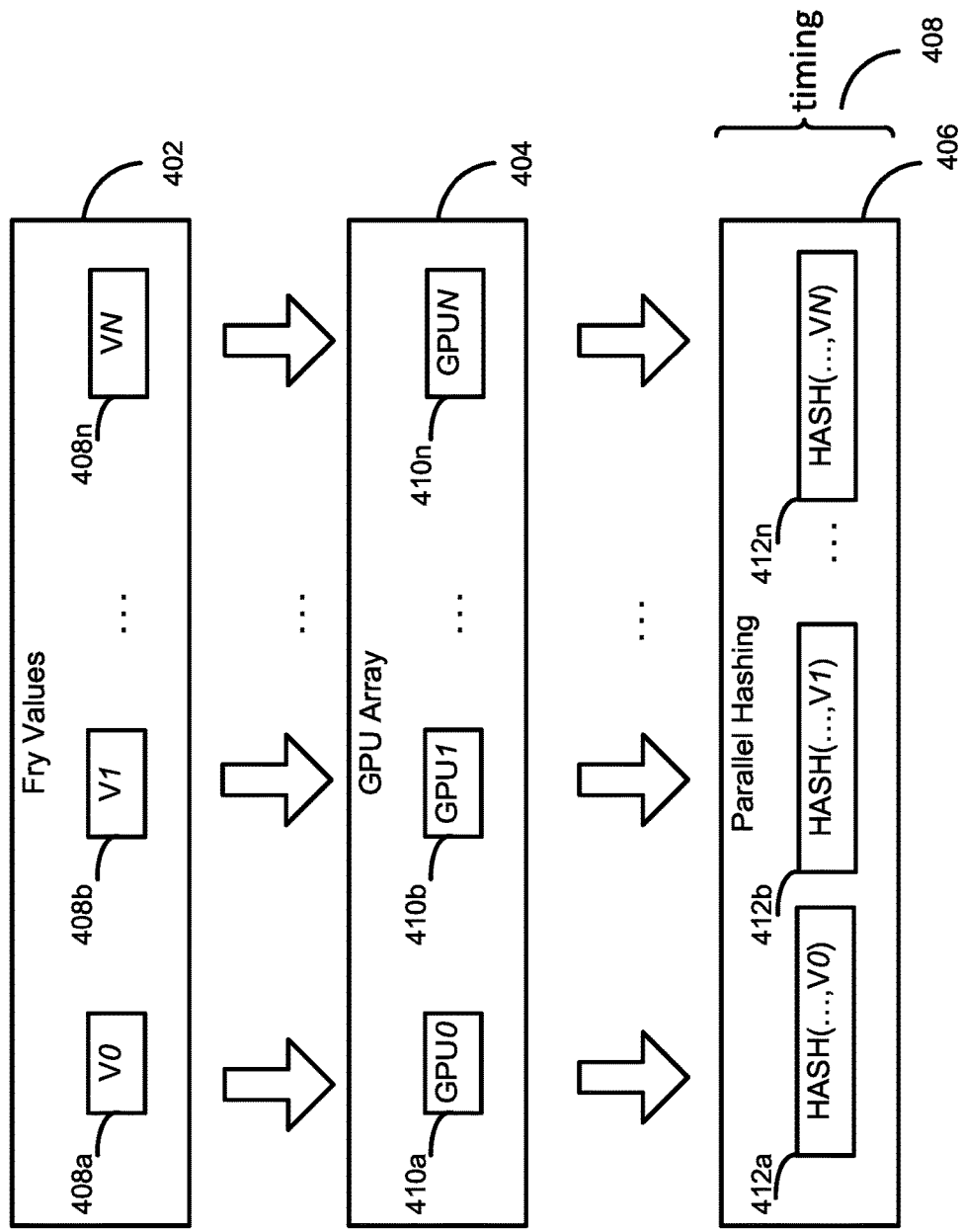
FIG. 4 depicts an exemplary array of Graphics Processing Units (GPUs) performing parallel hashing of fry values, according to one embodiment.

In general, the components comprising FIG. 1 may be implemented in separate threads or processes, as needed, and may process data in parallel. For example, hashing controller 146 may retrieve chunks, or subsets, of fry data 156 in parallel, and pass those chunks to GPU array 148 in parallel, as depicted in FIGS. 3 and 4, below.

In operation, a user may access frontend application 112 via user device 102. The user may access frontend application 112 via a graphical display device (not depicted) such as a touchscreen. Form generation unit 114 may render a signup and/or login form or other means of accepting user input in the graphical display device. Depending on whether the user is signing up for the first time or logging in, the operations of frontend application 112 and form generation unit 114 may differ.

At signup, for example, form generation unit 114 may display a signup form having input fields for a user identifier, a user password, and an email address. The form may include a submit button. The user may input a desired user identifier, password, and email address into the signup form and activate the submit button. Frontend application 112 may process the submitted form and transmit it, along with the information the typed into the input fields, to form processing unit 136 of remote computing device 104. Form generation unit 114 may redisplay the login form and, if there are errors, may explain any errors to the user.

Next, form processing unit 136 of remote computing device 104 may process the signup form. First, form processing unit 136 may validate that all input fields have been filled in, that they contain values within valid ranges, etc. Form processing unit 136 may pass the form inputs as parameters to backend application 138.

Backend application 138 may perform further processing of the input, such as sanitization and/or security checks. Backend application 138 may send email to the email address, if one is provided by the user, requiring that the user validate the email address. Backend application 138 may check a provided email address to determine whether, for example, a corresponding account already exists.

Next, backend application 138 may process the signup by creating a new user record in user data 150. To create a new user record, backend application 138 may generate a salt S. Alternately, salt S may be received by backend application 138, or retrieved by application 138 (e.g., from an external database or other system). The salt S may be based, in part, on user data, including without limitation and for example, a username $F_u$ and password $F_p$ provided by the user in the signup form F. Backend application 138 may next request a hashed salted peppered and fried password from hashing controller 146, providing the password $F_p$, and salt S to hashing controller 144 as sign up parameters.

Hashing controller 146 may accept the sign up parameters ($F_p$, S) and then retrieve a hashing function H (e.g., a cryptographic hash function such as SHA-256) from hash function selector 140, depending on pre-programming. In one embodiment, hash function selector 140 may select the hashing function from a plurality of available hashing functions. For example, the hash function selector may choose SHA-256 as the hashing algorithm. Hashing controller 146 may access hash parameters 144 P, which may correspond to the hash H. Hash parameters 144 may include cost parameters in embodiments where slow hashing functions are in use. Next, backend application 138 may initialize the hashing function H using hash parameters 144, i.e., backend application may prepare to call function H(P, . . . ) where P are parameters previously specified as corresponding to hashing function H.

Next, hashing controller 146 may retrieve a pepper value R from the pepper service 162 and one fry value $V_i$. In one embodiment, the backend application 138 may be configured to receive a pepper value R from a service (e.g., pepper service 162 or another service). The backend application 138 may retrieve the value (e.g., by calling an API).

In one embodiment, the fry value $V_i$ may be selected at random from the set of fry values V comprising fry data 156 or other data. In another embodiment, the fry value may be generated by backend application 138, wherein the fry value is limited to a defined range. A fry value generation algorithm may be used to obtain a fry value within a limited range. For example, a fry value generation algorithm may be programmed to generate a random fry value between 0 and 1024, inclusive. In either case, backend server 138 may not store a set of possible fry values and may rather store only a beginning and ending (i.e., sentinel) value. As noted above, the set or range of fry values must be unique and uniformly distributed, but it should be appreciated by those skilled in the art that any suitable method of selecting or generating a random value within a set or range may be employed. In yet another embodiment, the set of fry values may be generated each time a fry value is generated. In this way, the backend server may store only the ending and beginning values, but may select a value at random from a finite set of fry values. In embodiments wherein salt and pepper values are not used, fry values may be selected and/or generated by combining a uniformly-distributed fry value with random data (e.g., a random 8-bit string) chosen from a source of randomness, such as a random or pseudo-random number generator.

As described below with respect to FIGS. 2 and 4, to create the user's salted peppered fried hashed password for the first time, hashing controller 146 calls $H(F_p,S,R,V_i)=X$. That is, the hash associated with the user (the value X) is the hash of the password provided by the user in the sign up form, the salt value, the pepper value, and a randomly-selected fry value. The value X may be immediately returned to backend application 138. The generation of the salted peppered fried hashed password X is to facilitate password secrecy and secure communications. Specifically, as discussed above, an attacker cannot immediately use a hashed password because the password information is not evident in the hash. Additionally, communications using hashed fried passwords are secured by using random fry values in hashing, that are not stored and which provide computational complexity as described herein. Namely, relatively large amounts of computational power are required to test each possible fry value in a range or set.

In one embodiment, hashing controller 146 affirmatively destroys the fry value $V_i$ used to generate the hash X immediately after creating the hash value (i.e., immediately after calling $H(F_p,S,R,V_i)$) to prevent an attacker from learning the fry value that was used to create the hash. Such destruction may be accomplished in any suitable way. For example, if $V_i$ is assigned to a variable, the variable may be assigned a new value. If $V_i$ corresponds to a location in memory, then that location may be overwritten with zeroes. In some embodiments destroying the value of $V_i$ may comprise accessing the memory of a remote computing system. In one embodiment, the value $V_i$ may be deleted after generating the hashed fried password.

Upon receiving salted peppered fried hashed password (X) from the hashing controller 146, the backend application 138 creates a new row in the user data 150, in which the values salt S, the hash X, and the user name $F_u$ are associated together.

At a subsequent time, the same user may return and may need to authenticate. At that time, frontend application 112 and form generation unit 114 may display and process a log in form G in a manner substantially similar to that described above with respect to the sign up form F. The log in form G may have only a username field ($G_u$) and password field ($G_p$). As described above with respect to the sign up form F, form processing unit 136 of remote computing device 104 may accept submission of the log in form G and pass login parameters ($G_u$ and $G_p$) to backend application 138 for handling.

Backend application 138, detecting that a user is attempting to login, may retrieve the salt and stored hashed password from user data 150 that correspond to user $G_u$. This retrieval may be accomplished via a query, such as an SQL select query. In the foregoing example, the salt and stored hashed password would correspond, respectively, to the values S and X described above with respect to the log in example. Of course, it should be understood that if no hash X exists corresponding to user $G_u$, then backend application 138 would abort the authentication process completely and return an error message to user device 102, or take any other appropriate measures.

Backend application 138 may then, as in the above sign up example, request a hashed salted peppered fried password from the hashing controller 146, providing the password $G_p$ and salt S to the hashing controller 146 as log in parameters. In some embodiments, backend application 138 may provide an indication of the hashing function used to hash X to hashing controller 146. Such an indicator may be one of the field stored along with the user's other information in user data 150.

Hashing controller 146 may accept the log in parameters ($G_p$ and S) and then retrieve a hashing function H from hash function selector 140, and may initialize H with parameters retrieved from hash parameters 144. If backend application 138 provided an indication of the hashing function used, then hashing controller 146 may provide the indication to hash function selector 140, and hash function selector 140 may base its selection on the indication. In this way, the same hashing function may be selected to authenticate a user that is used when the user's password is initially hashed during sign up.

After receiving a hash function from hash function selector 140, hashing controller 146 may retrieve pepper value R from pepper service 162. Unlike the sign up case, wherein a single hash is created using a randomly-selected fry value $V_i$, in the log in (authentication) case, hashing controller 146 computes $\{H(G_p,S,R,v)|v\in V\}=K$. That is, a set K comprising the hash of the user-provided password, salt, pepper value, and fry value for every fry value in fry data 156. As described below in more detail, the set K may be computed in parallel using GPU array 148, in one embodiment.

Next, hash comparison unit 142 checks whether the set K contains the value X. If so, then the user is authenticated. If not, then the user is not authenticated. In some embodiments, the result from hash comparison unit 142 may be sent to another system, where it may be used in further processing (e.g., in the evaluation of a conditional statement). In one embodiment, the result from hash comparison 142 may be returned to the user device 102. Hash comparison unit 142 may return a value (such as "TRUE" or "FALSE") indicating whether the hashed user-provided password value matches the stored hashed password value. In this way, the hash comparison unit may be directly responsible for determining whether a user is successfully authenticated. The value may indicate the authentication state of the user (e.g., "logged in" or "logged out"), and the remote computing device 104 may transmit the authentication state to a remote computing device (e.g., a mobile computing device such as a phone). The hash comparison unit 142 may be subject to additional security restrictions and may be implemented in a secure computing environment, possibly within another computing device, in one embodiment.

Although the embodiment depicted in FIG. 1 includes a separate user device executing frontend application 112, user device 102 may merely display an application that is executing in remote computing device 104. It should be appreciated that many alternate configurations are possible. The depicted embodiment refers to usernames and passwords only, however, it should be appreciated that more complex authentication schemes using two-factor, multi-factor, and/or hardware authentication keys in addition to usernames and passwords are envisioned.

It should be understood that if a user types in an authentic password, then the authentication system (remote computing device 104, in the depicted embodiment) may be required to compute M hashes, where M is the number of fry values $V_i$ in the set of fry values V. For example, if the fry data consists of the set of integers $\{0, 1, \ldots 1024\}$ inclusive, then M=1024 and hashing controller may instruct GPU array 148 to compute the following hashes:

$H(G_p, S, R, 1) = K_1$ $H(G_p, S, R, 2) = K_2$ $\ldots$ $H(G_p, S, R, 1024) = K_M$ If, for example, the proprietor of remote computing device 104 has access to a compute cluster with 1024 cores and utilizes a slow hashing function with a one-second cost parameter, then the entirety of K may be computed, in parallel, in one second. Therefore, the longest time a user of remote computing system 104 may ever have to wait to login is one second. It should be appreciated that the techniques herein may be utilized without a cost parameter. In one embodiment, the entirety of K may still be computed in parallel, to frustrate attackers utilizing brute force, dictionary, and other attacks, but without adding a delay to each round of hashing in the authentication system.

However, if in the above scenario an attacker wanted to guess a user's password by a brute force attack, then the attacker would be required to compute 1024 hashes for every password the attacker wanted to test. Further, because the remote computing system does not indicate which of the 1024 fry data values is used to hash the user's password, the attacker must check every one. Any amount of parallelization that may be performed by the proprietor of the remote computing device 104 increases the attacker's burden by a product of that amount. For example, if the set of fry data has 200,000 possible values, then a parallel computing array may be expected to guess the correct key after 100,000 guesses on average. If all the guesses are performed in parallel at a cost of one second of compute time, then the entire time to verify a user password may be one second. But any method an attacker may choose would take 100,000 times as long to complete.

Without using the above-described fried password technique, a brute force attack wherein an attacker tested all 36^7 length-7 Roman alphanumeric passwords would take approximately 4.5 days to guess using a GPU array testing 100,000 passwords per second, assuming that on average only half of the hashes would need to be computed before a match is found. With the above-described fried password technique, an attacker would need 1242 years to perform the same computation. An equivalent serial attack (i.e., one without using any parallelization techniques) would take 123 million years to complete. Thus, the addition of a fry value to the password prior to hashing is seen to cause tremendous computational intractability for attackers, while still allowing the operator or proprietor of a service using password-based authentication to quickly authenticate a user.

Notably, once the hashed salted peppered fried password is created and saved, it is possible to increase the number of fry values in the fry data set. The effect of doing so will be to, as stated, increase the amount of time that an attacker will have to spend computing hashes. For example, doubling the number of fry values from 100,000 to 200,000 may cause the attacker to spend roughly twice as much time computing hashes.

Further, it is possible to "re-hash" a user's password to effectively change the fry value that is used for hashing the user's password. For example, if the fry value 42 is originally used to hash a user's password (e.g., when the user signed up) then the system could be programmed to perform a re-hash as follows: when the user logs in, authenticate the user using the techniques described above, i.e., compute $H(G_p, S, R, 42)$ for the password $G_p$ provided by the user in the log in form. Then, select a new fry value Q at random from the set of fry values, and perform and update of the hashed password value associated with the user in the user data 150, i.e., store the value $H(G_p, S, R, Q)$ in association with the user. The next time the user logs in, the hash value will be different, but will still be a valid hash (i.e., within the set K).

As noted above, a fast hashing algorithm, such as SHA2-256, may be used in some embodiments, in addition to a large max fry value for authentication (e.g., of a user). As noted, fry values may range from 1 . . . n, wherein n is any positive integer, or may be a range of values V chosen from a set, or which are generated. The selection of fry values may be based upon the speed by which a computer can compute a given number of hashes, and/or the cost to acquire and/or operate computers to perform such computations. For example, an application-specific integrated circuit (ASIC) capable of performing 14 trillion SHA2-256 hashes per second may be obtained. A set of fry values of cardinality 14 trillion may be chosen (e.g., the set of positive integers from 1 . . . 14,000,000,000), thereby allowing the ASIC to compute the SHA2-256 hash of a single password, an optional pepper and/or salt, and each respective fry value in approximately one second. The size of set of fry values may be increased to increase the difficulty of the hashing problem. Additional ASIC machines may also be added to make the hashing faster.

In a first authentication, a user may supply a password or another secret key to an application (e.g., frontend application 112). The password may be provided by way of an input device such as a keyboard or touch screen coupled to user device 102. Frontend application 112 may contain instructions which cause the password to be transmitted (e.g., via an HTTP POST operation) to a remote computing device (e.g., remote computing device 104 or user device 102).

Remote computing device 104 may include, or be communicatively coupled with, one or more of ASICs. The remote computing device may hash, in parallel, the user-supplied password and each of the respective set of 14 trillion fry values using the ASICs, until a valid hash (e.g., one matching a previously-stored hash associated with the user's account) is found. Once the fry value used to create the previously-stored hash is identified, that valid fry value may be transmitted to user device 102. In some embodiments, the password supplied by the user may be accompanied by a fry value supplied by a user or the user device (e.g., via frontend application 112).

Next, an application executing in the user device (e.g., frontend application 112) may receive and store the valid fry value received from the computing device securely. For example, the valid fry value may be stored in such a way as to obfuscate its location, and/or in a way that encrypts or scrambles its contents. To access the securely-stored valid fry value, the user may be required to provide additional authentication details (e.g., a biometric identification, a password, a private key, two-factor authentication data, etc.).

The user may subsequently seek a second authentication by providing to a computing device, a second password. The user-supplied second password and the securely-stored valid fry value may be transmitted to a computing device (e.g., remote computing device 104 or user device 102). The remote computing device used in the second authentication may differ from the remote computing device used in the first authentication, and in some cases, may be a client device such as a mobile computing device of a user.

The hash of the provided second password and valid fry value may be computed and checked against the stored hash associated with the user's account using, for example, the ASIC mentioned above. The hash initially computed and checked at the remote computing device by the ASIC may be the hash of the second user-supplied password and the securely-stored valid fry value. If the initial hashing produces the correct hash (e.g., the hash associated with the user's account) then the user may be authenticated in $\frac{1}{14}$ trillionth seconds (e.g., immediately). The fact of successful authentication may be transmitted from a computing device performing the hashing to the user in the form of authentication information, which may include a cryptographically signed authentication token, boolean (YES/NO) authentication data type, or other suitable construct. If authentication is unsuccessful using the user-provided password and securely-stored valid fry value, then an exhaustive search of all potential valid fry values may be performed as described above—specifically, the provided password may be hashed using all valid fry values in the set of 14 trillion valid fry values. This may be performed in parallel using one or more ASICs.

In this way, an expensive hashing (e.g., exhaustive) hashing need be performed only once per user device, and/or if the user's fry value changed. Otherwise, fast hashing may be used for authentication, and the time required to authenticate a user providing a correct password may never exceed one second, and will be extremely small in cases where the password and valid fry value (e.g., previously used to hash the user's password) are provided. In this way, after a user has successfully authenticated once, subsequent authentications may be performed using fast hashing, and may log the user in immediately.

In some embodiments, the pepper and/or salt may be included along with the valid fry value. The pepper may be stored in a database (e.g., pepper data 164) or alongside the valid securely-stored fry value in frontend application 112. In some embodiments, the salt value may be generated by a random number generator, and/or stored in association with the user's account. The salt value may be retrieved at runtime, prior to hashing, from a database based upon a user session or another suitable mechanism. It should be appreciated by those of skill in the art that although the above embodiment utilizing ASICs is described in terms of a client-server relationship, the hashing may be performed in a single user device, and no network access may occur.

In one embodiment, the cost to attackers may be increased by increasing the max fry value and/or by increasing the size of the set of fry values. For example, assuming a company may purchase the above-referenced ASIC device for $2100, and that the monthly electricity cost of operating the ASIC device is $135, then to brute force guess a 7-character password using the device would be expected to take 1242 years of computation time, equivalent to $2 million in electricity costs, per each password sought to be attacked. The cost to an attacker may be increased by increasing the number of possible fry values. For example, a company could select fry values in the range of 1 . . . 1400 trillion. With 100 of the ASIC-based devices, the company would require one second of time to validate a password/fry value combination (i.e., compute each possible hash using all possible fry values for a single password). An attacker would require $200 million in electricity costs and 124200 years of compute time per password to compute all possible combinations of 7-character passwords and possible fry values.

It will be appreciated by those of skill in the art that the cost both in terms of computation time and expense may vary. For example, when the 100 ASIC devices are not used for hashing related to authentication, they may be used to recoup costs (e.g., by computing hashes in connection to mining of cryptocurrencies (e.g., Bitcoin)). Therefore, the total cost to the purchaser of ASIC machines may be lower over time. Second, the above examples may assume, for simplicity, a single-threaded implementation. However, in multi-threaded embodiments, additional time/hardware may be required to serve multiple concurrent authentication requests. In some embodiments, the number of machines that are online at any given time performing hashing may be automatically determined by measuring and/or estimating the authentication demands of one or more applications, as balanced against acceptable wait times of users.

Exemplary Computer-Implemented Method

Figure 2:
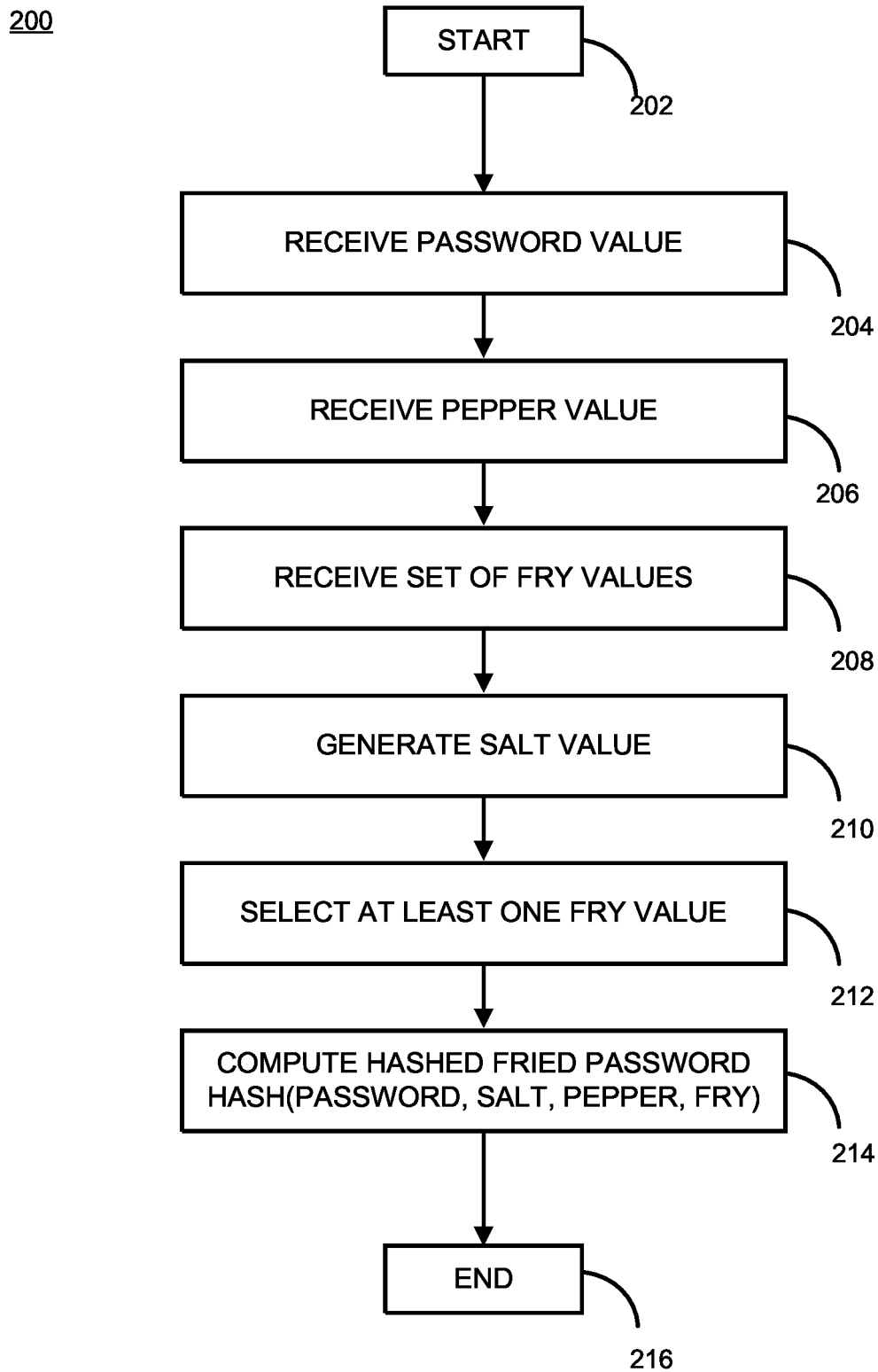
FIG. 2 depicts a flow diagram of an exemplary computer-implemented method by which hashed salted, peppered, and fried passwords may be created, according to one embodiment.

FIG. 2 is a flow diagram of an exemplary computer-implemented method 200 for generating a hashed, fried, salted password. The method 200 may be implemented by one or more processors of a computing device or system, such as the CPU 130 of the remote computing device 104 in FIG. 1.

In the method 200, the method begins (block 202). A password value is received (block 204). As discussed above, the password value may originate from a web form. In other embodiments, the password value may be non-textual, and/or may originate from another source, such as a terminal input or a hardware device. A pepper value is received (block 206). A set of fry values is received (block 208). A salt value is generated (block 210). In some embodiments the salt value is generated by a backend application such as backend application 138 with respect to FIG. 1. In other embodiments, the salt value may be generated by a hashing controller such as hashing controller 146 of FIG. 1. At least one fry value is selected (block 212). The hashed salted peppered fried password is computed (block 214). In some embodiments, the hash function used may be selected and may be initialized with hashing parameters, as depicted in FIG. 1. The method ends (block 216).

Exemplary Authentication

FIG. 3 is a flow diagram of an example method 300 for authentication by checking a hashed, fried, salted password. In the method 300, the method begins (block 302). A password value is received (block 304). The password may be, for example, the password $F_p$ or $G_p$ as described for FIG. 1 herein. In some embodiment, the password may be provided by means other than a web form, such as from a command line script or via an application programming interface. A pepper value is received (block 306). The pepper value may be, for example, the pepper value R as described for FIG. 1 herein. The pepper value corresponds to all passwords that have been heretofore created. A hashed fried salted password and salt are received (block 308). For example, the hashed fried salted password and salt may be, respectively, the hashed fried salted password X and salt S as described for FIG. 1 herein. These values may correspond to a user whose password may have been received in block 304. A set of fry values are received (block 310) that may correspond, for example, to the fry values V as described for FIG. 1 herein. For each of the fry values $V_0 \ldots V_n$, a candidate hash is computed, using the same password, salt, and pepper values (blocks 312a-312n). The function used for computing the candidate hashes may correspond to the hashing function H as described with respect to FIG. 1 herein, and may include a cost parameter. As discussed, the computation of candidate hashes may be performed in parallel using a GPU cluster (e.g., the GPU array 148 in FIG. 1). The set of candidate hash may be, for example, the set of candidate hashes K described for FIG. 1 herein.

After all candidate hashes are computed, the results are collated (block 314). The hashed fried password is analyzed to determine whether it matches any hash in the set of candidate hashes (block 316). If a match is found, then authentication occurs (block 318). If a match is not found, then authentication does not occur (block 312).

The method 300 may include more, fewer, and/or different blocks than those shown in FIG. 4. For example, rather than collating the candidate hashes and checking for the hashed fried password, the checking may be performed by each individual GPU comprising the GPU cluster, and the authentication process short-circuited (i.e., halted) if a match is found by one of the individual GPUs. In another embodiment, the method 300 may include an additional block in which the result of the hashing Exemplary Parallel Computing FIG. 4 depicts an exemplary computing environment 400 in which parallel hashing of fried salted peppered passwords may be implemented and in which slow hashing functions may be implemented, according to one embodiment. Block 402 represents a set of fry values $V_0 \ldots V_n$ being individually processed by GPU array 404 comprising individual GPU cores 410a-410n. The set of fry values may correspond to the set of fry values Vas described for FIG. 1, herein. Each of GPU 410a-410n may be an individual processor capable of executing instructions, including hashing functions. GPU 410 may be, for example, GPU array 148 as described for FIG. 1, herein. All fry values 408a-408n may be simultaneously provided to respective GPU cores 410a-410n via a mechanism that may include direct access, shared memory, pointers, inter-process communication, and/or transmission over a computer network such as the network 118 depicted in FIG. 1.

Each GPU core 410a-410n may contain a separate set of instructions that causes each respective core to evaluate a hashing function for the respective fry value 408a-408n received, along with a specified password, salt, and/or pepper value. The respective hashing function, password, salt, pepper values, fry values, and hash value may correspond to, for example, the values H, $G_p$, S, R, $V_1$ and $K_1$ as described for FIG. 1, herein. This hashing may be done in parallel as depicted in parallel hashing 406, and may be associated with timing 406 (e.g., one second). Timing 408 may correspond to a parameter (e.g., the cost function discussed with respect to slow hashing functions above). For example, hash parameters 144 of FIG. 1 may contain a delay parameter which is set to two seconds. In that case, the parallel hashing 406 timing 408 parameter may take two elapsed wall clock seconds to hash N fry values 408a-408n where N is the number of available cores. For example, given a GPU array with 1000 cores, and a cost parameter of 1 second, all 2000 fry values can be hashed in four seconds total. Therefore, the user can be authenticated in four seconds total. As noted above with respect to FIG. 1, an ASIC array/cluster may be used in addition to, or as an alternative to, GPU array 404.

Exemplary Fry Key Usage

Leaking user passwords due to a cyber attack presents a large risk to users who might use identical or similar passwords across multiple sites. As noted elsewhere herein, there have been several modern advances to help deal with the sensitivity of passwords.

The first countermeasure is storing hashed versions of each password instead of storing plaintext passwords. When future users attempt to authenticate themselves, their password is hashed and is compared against the stored hashed version. A match is required to authenticate the user.

The second countermeasure is appending a salt key to the end of the password before hashing it. The hashed version of the password also has the salt appended to it. Salting passwords helps protect against rainbow table attacks.

The third common countermeasure is peppering the password. A complex secret key that is only available in a separate locked down system is added to the end of all passwords before they are hashed. If the password tables are compromised but this other system is not compromised, this secret key must be guessed to break the passwords.

The final common countermeasure is slowing down the hashing algorithm (e.g. bcrypt). Using a slower hashing algorithm makes single processor brute force attacks very difficult.

One issue with common countermeasures is that sometimes a company's entire system is compromised. In this case, the salt keys, pepper key, hashing algorithm, and hashed passwords would all be leaked. The attacker would brute force attack each user's account by hashing all common passwords+the user's salt key+the pepper key. A modem attacker would have this attack occur in a distributed sense, either with a computing cluster of CPUs or GPUs. Even if the bcrypt hashing algorithm is able to slow down the time it takes to hash each password, by distributing the attack, many password attempts can be guessed simultaneously. This means that select high-value user accounts may be targeted and be efficiently broken in the current system. Increasing the runtime requirements of the bcrypt algorithm will eventually create a user experience issue where the user would have to wait a long time to sign in to their account and therefore is not an ideal solution.

The present embodiments provide a solution these issues. In one embodiment, the present systems and methods may prepend or append another key (a "fry key") to the password before hashing it, but do not save this other key. The password value may be modified, by the combination of the password, fry value, and/or other values. For an e-commerce or other online company wanting to verify a user's password, every possible key that could have been appended must be checked. This may be performed in parallel by the e-commerce company so it does not impact the user experience (such as during e-commerce or conducting sales/service over the internet via wireless communication with mobile devices). Any amount of parallelization that can be performed by the e-commerce company increases the attacker's burden by a product of that amount.

As a concrete example, if the key that is appended has 200,000 possible values, then a GPU rig would be expected to guess the correct key after 100,000 guesses on average. If all of these guesses are performed in parallel and the cost of the bcrypt algorithm equates to one second of compute time, then the entire time to verify a password would be one second.

On the other hand, any method an attacker would use would take 100,000 times as long to complete. A brute force attack where the attacker tests all bcrypt hashed 36^7 seven letter passwords would take on average 4.5 days to guess using a GPU rig that tests 100,000 passwords a second. Using the proposed method would take an attacker 1232 years to perform the same computation. If the attack is performed on a single machine, it would take 123 million years to complete.

Figure 5:
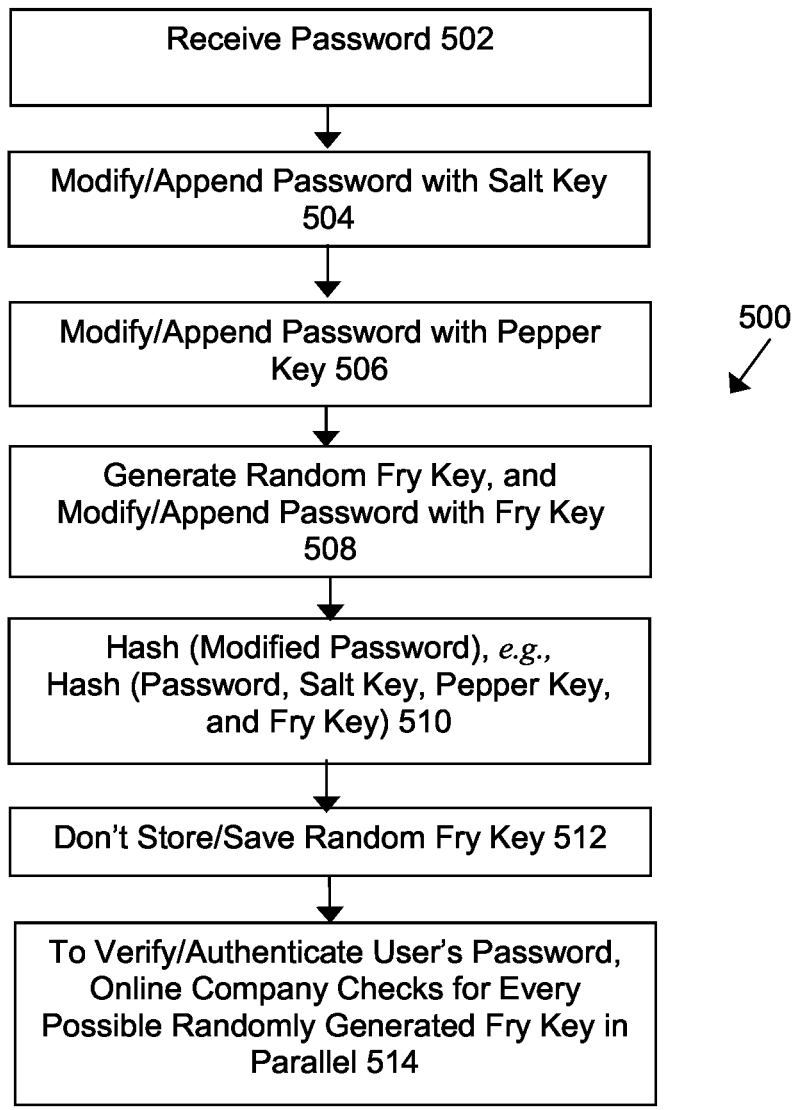
FIG. 5 depicts a flow diagram of an exemplary computer-implemented method by which hashed salted, peppered, and fried passwords may be created and/or authenticated, according to one embodiment.

FIG. 5 depicts a flow diagram of an exemplary computer-implemented method 500 by which hashed salted, peppered, and fried passwords may be created and/or authenticated. The hashed fried passwords may be created locally, such as on user's mobile device, and authenticated remotely, such as at an e-commerce or online company's remote server.

At a user mobile device, the method 500 may include receiving, via one or more processors, a user password 502, such as by a user keying in the password via a touch screen. The method 500 may include, via one or more processors, modifying/appending the password with a salt key 504 (such as adding 123 or ABC to password), and/or with a pepper key 506 (e.g., a complex secret key that may be stored in a separate system or memory unit). The method 500 may include, via one or more processors, generating a temporary fry key 508, which may be a random number, such as 527,134, and/or further modifying or appending the password with the random fry key. The method 500 may include, via one or more processors, hashing the modified/appended password and/or performing a hash on (password, salt key, pepper key, fry key) 510. The method 500 may include not storing or saving the randomly generated fry key 512, either locally or remotely.

At an e-commerce company's remote server (or other company in wireless communication with the user's mobile device), the method 500 may include, via one or more processors, verifying or authenticating the user's password by checking for every possible randomly generated fry key (by which the password was modified/appended prior to or during hashing) in parallel, as discussed elsewhere herein. The method may include additional, less, or alternate actions, including those discussed elsewhere herein. For example, the method 500 may include, via one or more processors, verifying or authenticating the user's password by hashing the password, salt, pepper with every respective fry key from a finite set of known fry keys, wherein one of the fry keys in the set of known fry keys was the fry key used to hash the user's hashed salted password.

Figure 6:
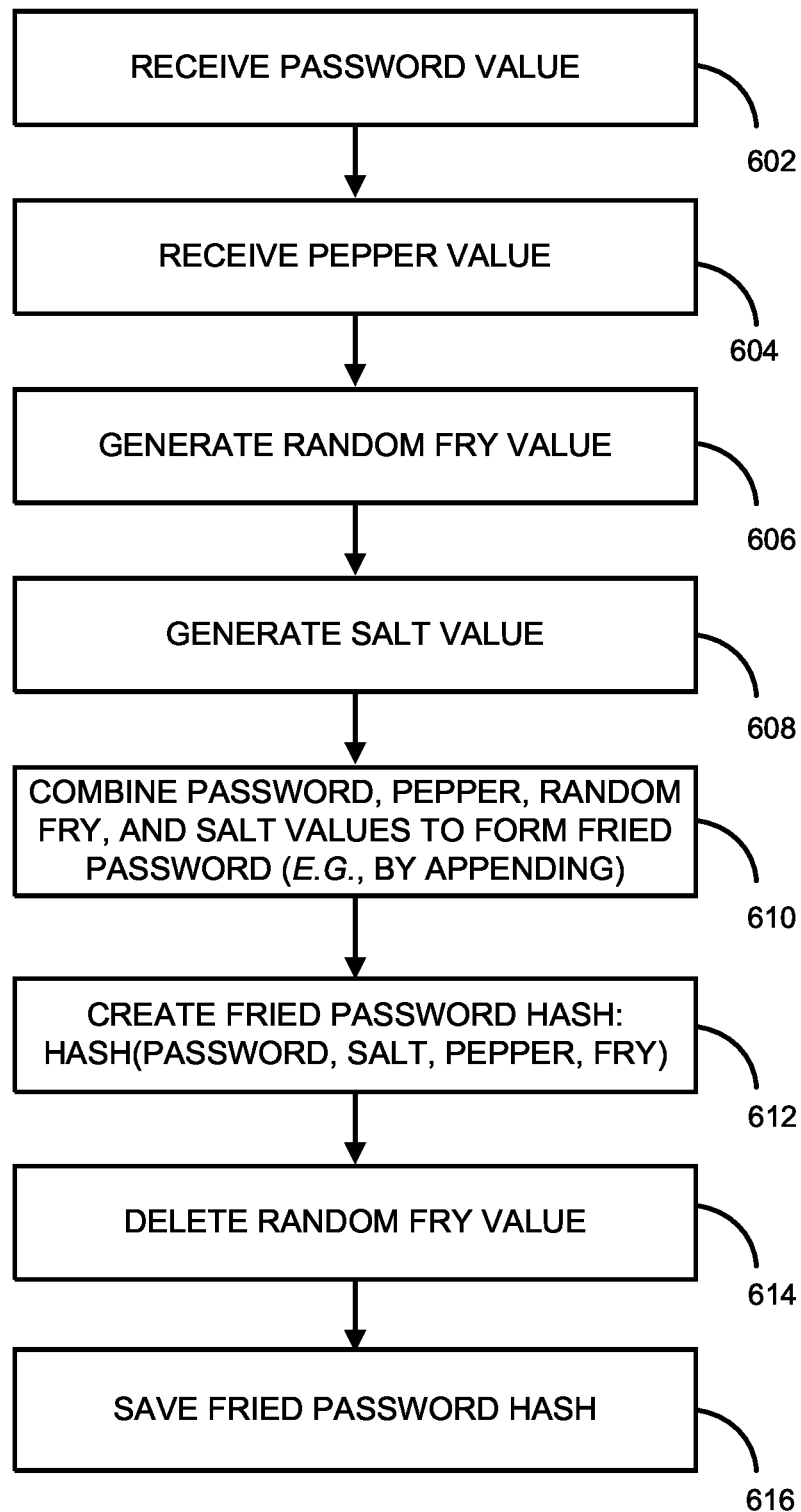
FIG. 6 depicts a flow diagram of an exemplary computer-implemented method by which hashed salted, peppered, and fried passwords may be created and associated with a user, according to one embodiment.

FIG. 6 depicts a flow diagram of an exemplary computer-implemented method 600 by which hashed salted, peppered, and fried passwords may be created. The hashed fried passwords may be created locally, such as on user's mobile device, and authenticated remotely, such as at an e-commerce or online company's remote server.

At a user mobile device, the method 600 may include receiving, via one or more processors, a password value, such as by a user keying in the password via a remote computing device (block 602). The method 600 may include receiving a pepper value (block 604). The pepper value is a secret key and may be stored in a secured location (e.g., secure remote server, a USB stick or other computer peripheral, hardware authentication device, etc.) and may be received via a secure means such as an encrypted protocol (e.g., via HTTPS). Authentication with a remote computing system (e.g., via password and/or secret key) may be required to access the pepper value. Such a remote computing system may implement any suitable access controls. In general, the method 600 may include more, fewer, and/or alternate blocks.

For example, the method 600 may include deleting or overwriting the pepper value with zeroes or random data after the method is finished using the pepper value (e.g., to generate or authenticate a hash). The method 600 may include, via one or more processors, generating a temporary, random fry value within a range and/or by selecting the value from a set (block 606), wherein the selection is based upon the identity of the user or another factor. The method 600 may include generating a salt value (block 608). In one embodiment, the salt value may be retrieved or received from another device.

Next, the method may include combining the password, pepper value, random fry, and salt values to form a fried password (e.g., by appending or concatenating the values) (block 610). The method 600 may include creating a fried password hash by calling a hashing function with the input values of password value, salt value, pepper value, and fry value. In one embodiment, the values may be concatenated together in the foregoing order, or another order (e.g., where the values comprising the hash inputs are provided to a hashing function in a different order). The ordering of the hashed values may be set by convention in a process responsible for hashing (e.g., in hashing controller 146). The method 600 may include deleting the random fry value used to create the fried password hash (block 614).

The method 600 may include an additional or alternate block wherein a deleting strategy is chosen. For example, a secure preference may be selected that causes the random fry value to be overwritten a number of times consecutively with random bits.

The method 600 may include a verification block that checks whether the random fry value has been successfully overwritten and, if so, saves an indication of success to an electronic audit log that is associated with the user, a web session, IP address, and/or other metadata. Finally, the method 600 may include saving the fried password hash (block 616). The method 600 may save the fried password hash to any suitable location (e.g., to an electronic database), and may associate the fried password hash to other data corresponding to the user.

Remote Authentication & Parallel Processing

Figure 7:
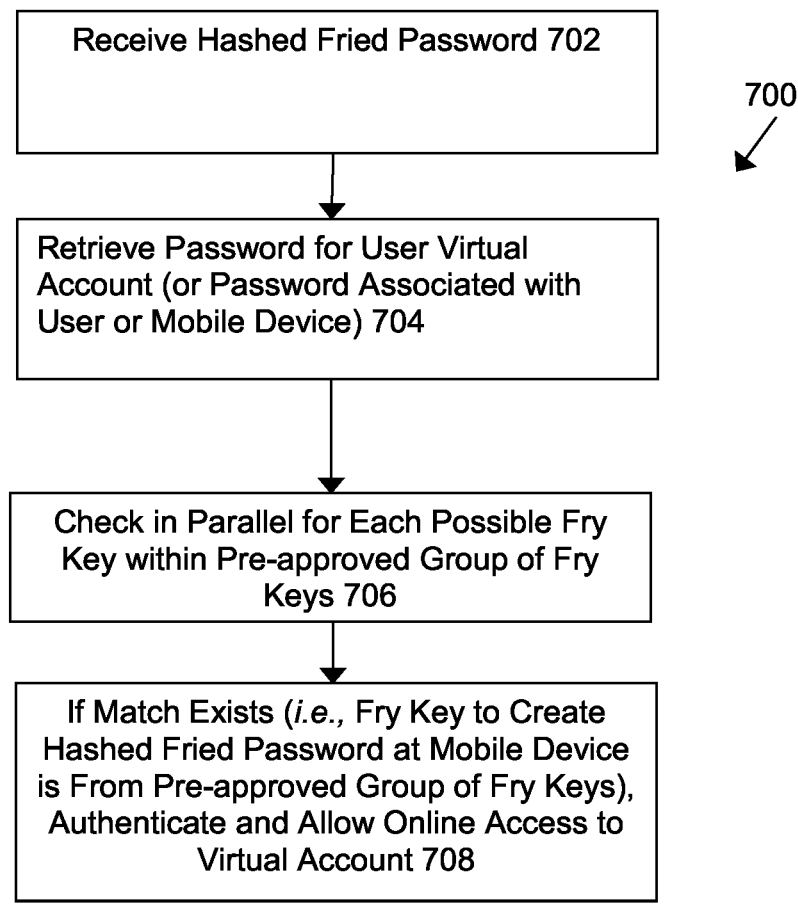
FIG. 7 depicts a flow diagram of an exemplary computer-implemented method by which a user virtual account or password associated with a user or device may be retrieved, and hashes checked in parallel to authenticate and allow access to the virtual account, according to one embodiment.

FIG. 7 depicts a computer-implemented method for remotely authenticating a user or user mobile device using a hashed fried password 700. The method 700 may include (1) receiving, at a remote server and/or an associated transceiver, a hashed fried password associated with a virtual user account, user, or user mobile device 702. For instance, a user's mobile device may send the hashed fried password to a remote server, such as via wireless communication or data transmission over one or more radio links or communication channels. The remote server may be tasked with authenticating the user and/or user mobile device before remote access is given to an online application, such as an online application associated with e-commerce or financial services. The user's mobile device may have created the hashed fried password using a temporary, random fry key that is not permanently stored at the mobile device, as discussed elsewhere herein.

The method 700 may also include, at the remote server and/or associated transceiver, (2) retrieving a user password associated with the virtual user account, user, or user mobile device 704, such as from a memory unit; (3) in parallel and using several processors, checking for each possible and pre-authorized fry key within a pre-approved group of several fry keys that may have been used with the user password to create the hashed fried password at the user mobile device 706; and/or (4) if a match exists (i.e., the fry key used at the user mobile device to create the hashed fried password is from among the group of pre-approved fry keys), then authenticating the user and/or user mobile device, and allowing the user online access to their virtual account via their mobile device 708 to facilitate secure communication or online account access with minimal or no impact on customer experience. The method may include additional, less, or alternate actions, including those discussed elsewhere herein.

Figure 8:
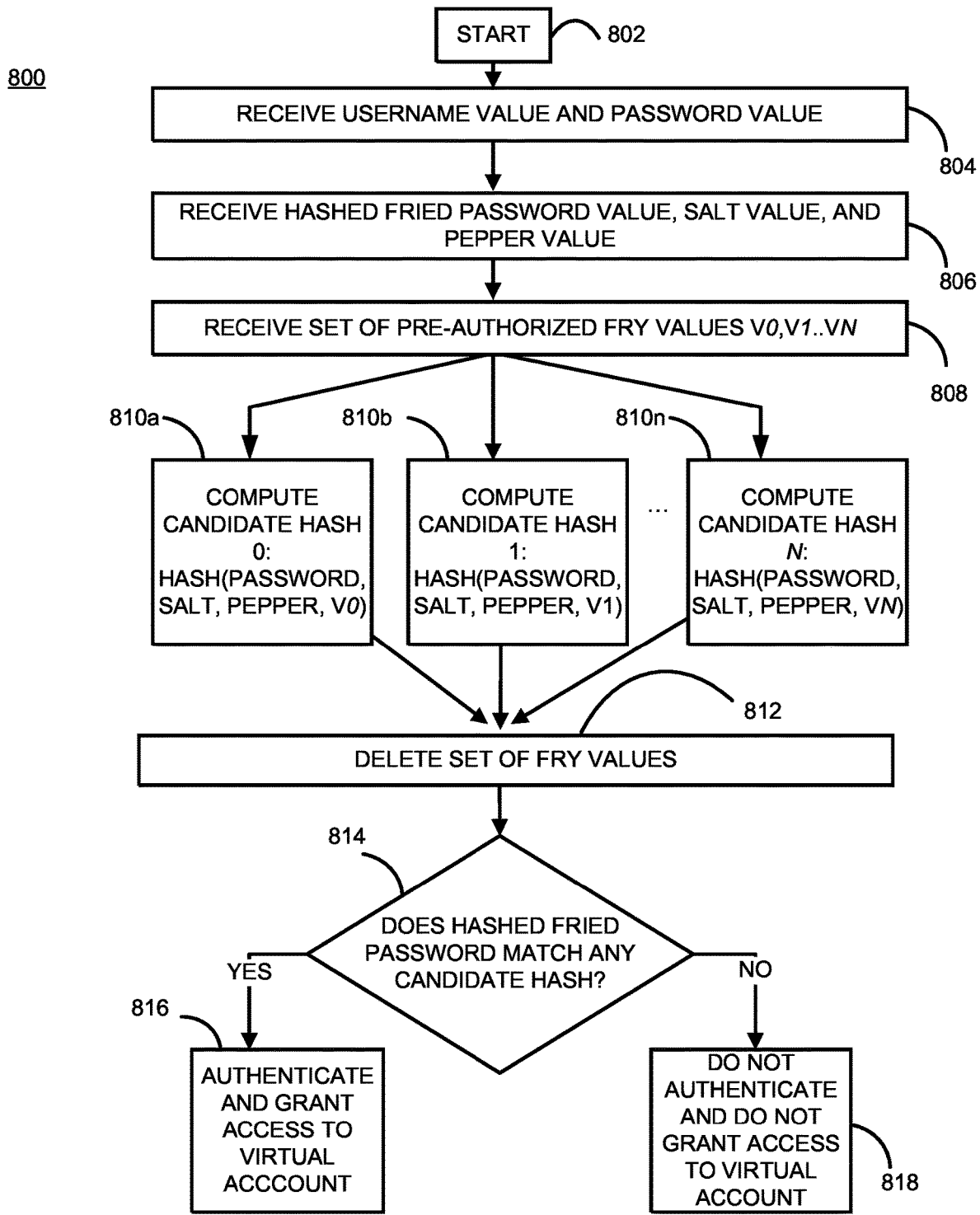
FIG. 8 depicts a flow diagram of an exemplary computer-implemented method for remote authentication to facilitate password secrecy and secure communications.

FIG. 8 depicts another computer-implemented method 800 for remotely authenticating a user or user mobile device. The method 800 may include receiving a user-provided username value and password value (block 804) and receiving a hashed fried password value, salt value, and pepper value (block 806), wherein these values may be retrieved from a remote system (e.g., remote computing device 104). The method 800 may further include receiving a set of pre-authorized fry values $V_0 \ldots V_n$ (block 808) and computing, for each fry value v in the set V the hash of the password value, salt value, pepper value, and v, to yield a candidate hash for each of the values v (blocks 810a-810n).

In some embodiments, the method 800 may include deleting the set of pre-authorized fry values 808 for the purpose of facilitating password secrecy and secure communications (block 812), including without limitation, overwriting the set of fry values with zeroes or random data. Specifically, if an attacker is unable to learn which fry values are pre-authorized, then the attacker may encounter greater difficulty in attacking hashes created using those fry values. The method 800 may further include checking whether any of the candidate hashes created for each of the fry values v in the set of fry values V matches the hashed fried password corresponding to the user by, for example, comparing the hashed fried password to each candidate hash (block 814).

In some embodiments, the computation of the candidate hashes and/or the comparison of the hashed fried password to each candidate hash may be performed in parallel (e.g., by the use of a GPU array such as GPU array 148). When the hashed fried password matches a candidate hash, the method 800 may include authenticating the user and/or granting access to a virtual account of the user (block 816). For example, the user may have an account on a computing system implementing the method 800, and that account may be unlocked or otherwise made available to the user upon successful authentication.

In one embodiment, the user's web browser may receive an encrypted cookie that may expire but which prior to expiration may allow the user to access otherwise off-limits portions of a web site. In another embodiment, a successful authentication as depicted in block 816 may cause a remote computation server, such as remote computing device 104. to decrypt a file (e.g., a file stored in user data 150) for the user's viewing or other access.

In one embodiment, an indication of whether the hashed fried password matches at least one candidate hash (i.e., the authentication state) may be transmitted via a communication network to another computer, user, and/or service. For example, user device 102 may transmit a boolean authentication state (e.g., AUTH or NO-AUTH) to remote computing device 104 via network 118.

In another embodiment, the computer transmitting the authentication state may comprise a hardened communication module that may apply additional security measures to ensure the authenticity of authentication state transmitted via a communication network. For example, a hardened communication module may encrypt the authentication state at the application layer or session layer. One of ordinary skill in the art will appreciate that many sensitive and potentially revealing operations may immediately follow a successful authentication event, and that multiple layers of authentication are envisioned (e.g., by the use of the authentication techniques described herein in conjunction with complementary technologies such as two-factor and/or multi-factor authentication).

In operation, a set of fry values V such as that depicted in block 808 may comprise integer values taken from the set 1 . . . n wherein each integer value has been pre-authorized or pre-approved for use as a fry value. A person or entity (e.g., a corporation) that owns or controls a computing device that implements the method 800 may designate certain fry values in a set of fry values (e.g., V) as pre-authorized, and/or may revoke pre-authorized status. For example, at one point in time, V may comprise the set of integer values {0,1,2,3,4} wherein each of the integer values is pre-authorized. At a later time, the set V may comprise the values {5,6,7}. In this example, at the second point in time, a different set of values may be pre-authorized and all prior values may be—explicitly or effectively—revoked.

In some embodiments, multiple, optionally intersecting sets of pre-authorized fry values may be provided to authenticating applications for use at different times or under certain factual circumstances. For example, a first pre-authorized set of fry values $V_1$ may comprise the integer values {0,1,2}. A second pre-authorized set of fry values $V_2$ may comprise the integer values {2,3,4}. The set intersection of $V_1$ and $V_2$ is {2} and an application (e.g., frontend application 112 or backend application 138) may be configured to use one of $V_1$ and $V_2$ in attempted authentication of user-provided passwords.

In one embodiment, an application making use of one of the pre-authorized sets may be provided $V_1$ in the morning and $V_2$ in the evening. In this way, the ability of classes of users to authenticate may be controlled by the use of pre-authorized fry values. Specifically, only a user whose hashed fried password value was initially created with a pre-authorized value will be able to successfully authenticate.

In one embodiment, each user of an authentication system may be associated with a set of fry values. This set may be retrieved and used to generate candidate hashes via the methods described herein at the moment a user attempts to authenticate. Alternatively, or in addition, the set of fry values associated with the user may be comprise pre-authorized fry values. The foregoing examples are mere illustrations; it should be understood that using different sets of pre-authorized values based on a variety of logical tests is envisioned.

In some embodiments, at least some, or even all, actions of the method 800 may be performed in, or directed by, a mobile computing device such as a smart phone, tablet, wearable device, laptop, or any other suitable device. Specifically, the receipt of password, salt, fry, and other values may occur in a mobile computing device, and all computation, including without limitation parallel hashing, may be performed by the mobile computing device (e.g., user device 102). In one embodiment, the mobile computing device itself may generate the set of pre-authorized fry values. Receiving the hashed fried password value, salt value, and pepper value may comprise retrieving those values from a remote computing device (e.g., remote computing device 104), and may require the mobile computing device to issue a prerequisite request (e.g., an HTTP request from the mobile computing device to the remote computing device) which may contain a parameter uniquely identifying the user seeking to authenticate.

Alternatively, at least some, or even all, actions of the method 800 may be performed at, or directed by, a remote server, such as a financial services provider's or e-commerce company's remote server. Specifically, the receipt of password, salt, fry, and other values may occur at the remote server, and all computation, including without limitation parallel hashing, may be performed by the remote server and/or associated processors. In one embodiment, either the remote server or the user's mobile device may generate the set of pre-authorized fry values. Receiving the hashed fried password value, salt value, and pepper value may comprise receiving those values, at a remote server, from a user's mobile device (such as wireless communication or data transmission), and may require the user's mobile device to issue a prerequisite request (e.g., an HTTP request from the user's mobile device to the remote server) which may contain a parameter uniquely identifying the user, or user mobile device, seeking to authenticate and ultimately allow online access to one or more user virtual accounts—which access to may be controlled by the remote server that is associated with an e-commerce company.

Figure 9:
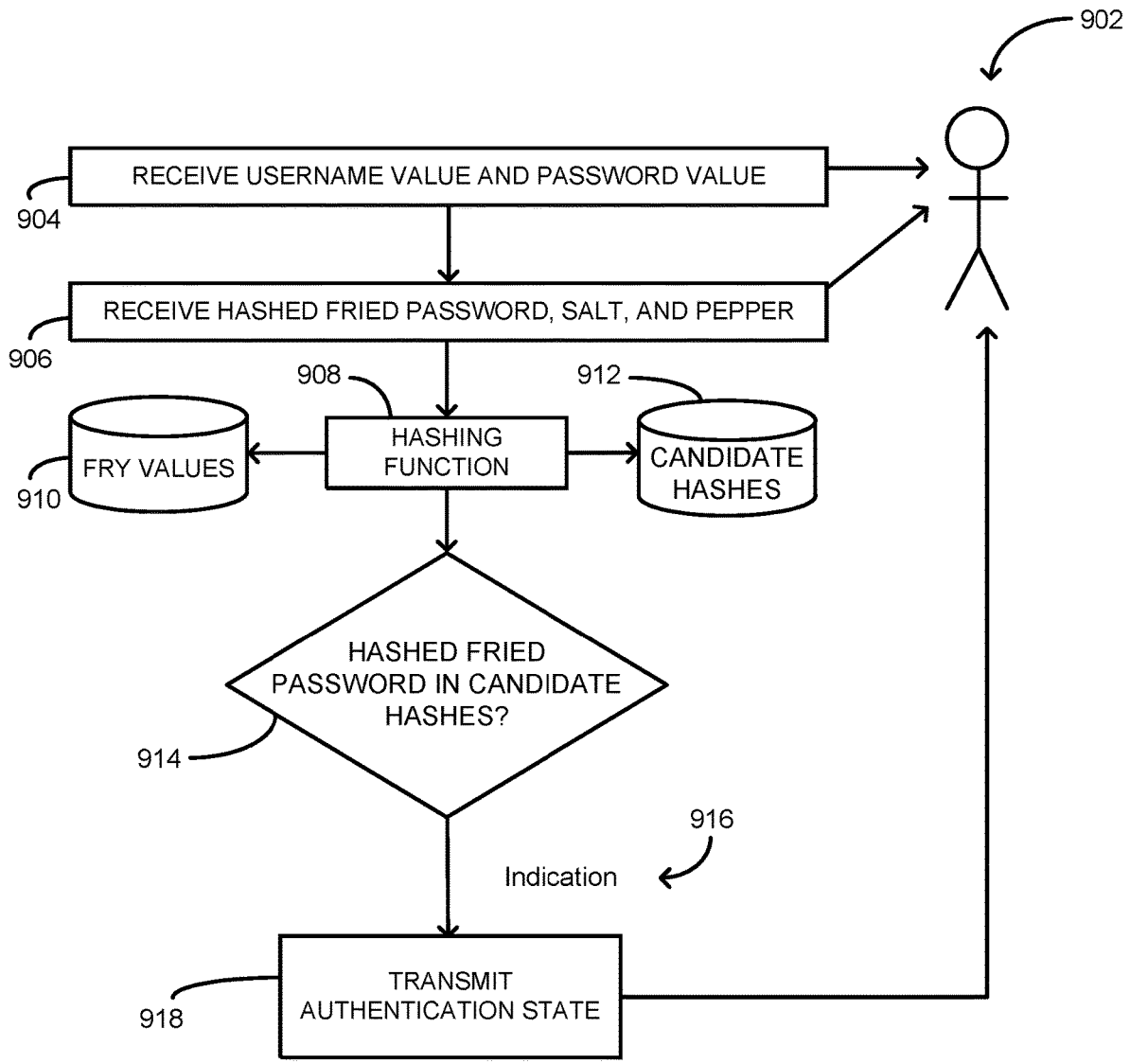
FIG. 9 depicts a system flow diagram of an exemplary computing system for determining and transmitting an authentication state of a user, according to an embodiment.

Turning to FIG. 9, a system flowchart for determining a user authentication state and transmitting the authentication state to a user is depicted, according to an embodiment. The system 900 may receive a username value and password value (block 904) and the system 900 may also receive a hashed fried password, salt value, and pepper value (block 906). Each of the username, password, hashed fried password, salt value, and pepper value may be received from and/or associated with, a user 902, and/or a mobile computing device operated by user 902. The mobile computing device operated by user 902 may correspond to, for example, user device 102. The system 900 may further include a hashing function (block 908) which is applied to each fry value in a set of fry values (block 910) to create a set of candidate hashes (block 912). Fry values 910 and candidate hashes 912 may be implemented using one or more electronic databases, as flat files, or by the use of any other suitable data storage technology. For example, fry values 910 may correspond to fry data 156. As noted above, the hashing performed by hashing function 908 may, in some embodiments, be performed in parallel (e.g., by GPU array 148). After candidate hashes 912 are generated, or as they are generated, system 900 may check whether the hashed fried password associated with user 902 is found within the set of candidate hashes 912 (block 914), and an indication 916 of whether such check evaluates as true or false may be generated. System 900 may transmit authentication state (block 918) to user 902 and/or a mobile computing device operated by user 902, via a communication network such as network 118.

Authentication state may comprise a boolean value (True/False) or more complex authentication information. For example, in an embodiment, system 900 may transmit authentication state to user 902 representing a signed and/or encrypted token (e.g., a cookie). The authentication state may include asymmetric or symmetric keys. In some embodiments, transmission to user 902 may occur over HTTP, and data received by system 900 may be transmitted via HTTP. For example, system 900 may receive, from a remote computing device such as user device 102, a username, password, hashed fried password, salt, and/or pepper value associated with user 902. System 900 may receive such information after sending a request to user device 102 which includes a parameter uniquely identifying the user (e.g., a user id).

In some embodiments, fry values 910 may be uniquely associated with user 902, such that each user of system 900 may be associated with a distinct and/or distinctly-ordered respective set of fry values. In some embodiments, the set of fry values 910 may comprise a pre-authorized set of fry values. For example, if the set of fry values comprises integer set 1-100, the set of preauthorized values may be (42). In that case, only candidate hashes using 42 as a parameter would authenticate user 902, even if the hashed fried password of the user matched a candidate hash created using another fry value (e.g., 41).

In an embodiment, if system 900 finds the hashed fried password associated with user 902 in candidate hashes 912, system 900 may, authenticate the user 902 and/or user mobile device. For example, system 900 may set a flag or write data to a location in memory or on disk, denoting that a user (e.g., a particular user session or IP address) is authenticated. Conversely, a user may be unauthenticated, or deauthenticated, in case system 900 does not find hashed fried password in candidate hashes 912 (e.g., a flag may be unset or reset). Although system 900 is depicted as being communicatively coupled with user 902, system 900 may be a mobile computing system (e.g., a smart phone, tablet, laptop, etc.). Some or all of the operations performed by system 900 may be performed in the mobile computing system (e.g., user device 102), and some or all may be performed in a remote computing device such as remote computing device 104.

Figure 10:
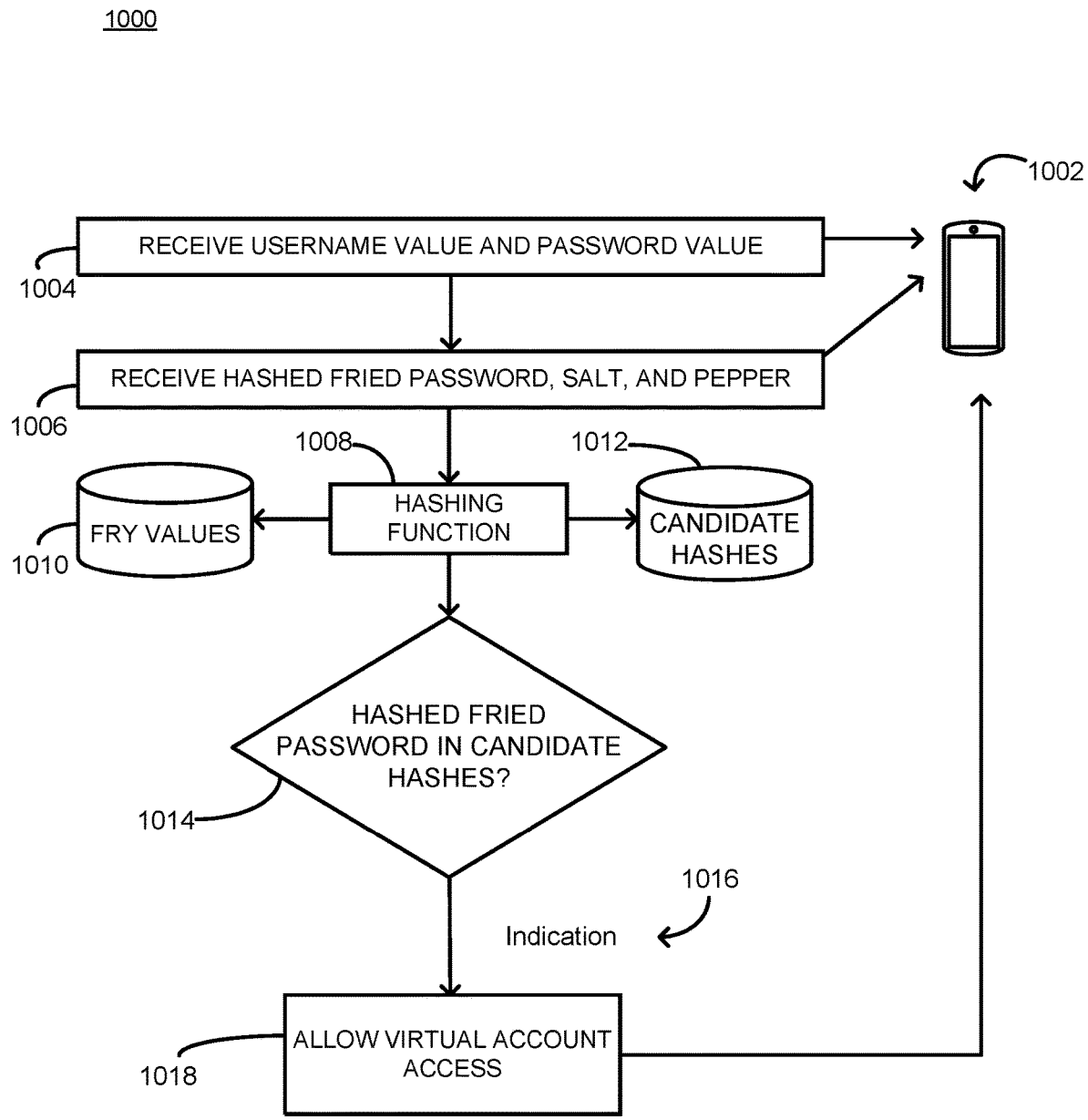
FIG. 10 depicts a system flow diagram of an exemplary computing system for determining an authentication state and allowing virtual access to a user mobile device, according to some embodiments.

With respect to FIG. 10, a system flowchart for remote authenticate to facilitate password secrecy and secure communications is depicted. System 1000 may include a user mobile device 1002, from which system 1000 may receive a username value and password value (block 1004). System 1000 may also receive hashed fried password, salt, and pepper (block 1006) from user mobile device 1002. In an embodiment, hashing function 1002 may be applied to each fry value in a set of fry values 1010 to generate a set of candidate hashes 1012. System 1000 may determine whether a hashed fried password appears in the set of candidate hashes 1012 (block 1014). System 1016 may allow the user of user mobile device 1002 to access their virtual account via user mobile device 1002 to facilitate secure communication and authentication (block 1018). Allowing user of user mobile device 1002 to access their virtual account may comprise redirecting user mobile device 1002 to a secure section of a web site, serving restricted content to user device 1002, and/or providing user device 1002 with an authentication token which allows user device 1002 to access secured or restricted parts of a web site. In an embodiment, system 1000 may generate the set of fry values 1010. In some embodiments, system 1000 may retrieve and/or receive the set of fry values 1010 from a remote computing system, which may, in some embodiments, be a set of fry values associated with the user of user mobile device 1002. A set of fry values may be associated with a user by means of a user id or other identifying information. In some embodiments, the set of fry values 1010 may be deleted after being generated, received, and/or retrieved. Deletion may take the form of erasing from a solid state or volatile disk storage device, and/or overwriting with random or constant data (e.g., zeroes).

In an embodiment, if a hashed fried password of a user mobile device 1002 appears in the set of candidate hashes 1012, the user mobile device 1002 may be authenticated. Such authentication may be referenced by a session, IP address, and/or device identifier associated with user mobile device 1002. In this way, any user of user mobile device 1002 may have access to content restricted to an authenticated device. In some embodiments, an authenticated user device 1002 may be allowed virtual account access. For example, an application within device 1002 (e.g., frontend application 112) may receive data corresponding to the user. For example, user profile information (e.g., name, age, location, preferences, etc.) may be loaded when the user device 1002 is authenticated. Virtual account access may also enable the user of user mobile device 1002 to perform restricted actions (i.e., actions that are unavailable to a non-authenticated user) such as making a purchase/payment, acquiring or disposing of an asset, starting or stopping a subscription, and so forth. The user may be allowed to access a virtual account associated with the user to facilitate online authentication, in some embodiments. Although system 1000 is depicted as being communicatively coupled to a user device 1002, system 1000 may, in some embodiments, be integral to a mobile computing system (e.g., user device 102). It should be appreciated that system 1000 may have many uses, and the purpose for which system 1000 is being used may affect the configuration of system 1000 as a client-server, client-, or server-based system.

ADDITIONAL EMBODIMENTS

In one aspect, a computer-implemented method for creating a hashed fried password may be provided. The method may include (1) receiving, in a computing device, a password value of a user; (2) receiving, in the computing device, a salt value; (3) receiving, in the computing device, a pepper value; (4) generating, by a computer processor accessing a random number generator, a temporary, random fry value; (5) generating a fried password by a computer processor combining the password value, the salt value, the pepper value, and/or the temporary, random fry value (such as modifying or appending the password value with the salt, pepper, and/or temporary, random fry values); and/or (6) generating a hashed fried password, by a computer processor applying a hashing function to the fried password to facilitate maintaining password secrecy and secure communications. The temporary, random fry value may not be not saved or otherwise permanently stored in a local or remote memory unit to facilitate preventing an attacker learning the value of the fry value. Additionally or alternately, the method may include deleting or erasing the random fry value after the fried password or the hashed fried password is generated. The method may include additional, less, or alternate actions, including those discussed elsewhere herein.

In another aspect, a computer-implemented method for authenticating a hashed fried password may be provided. The method may include (1) receiving, in a computing device, a password value of a user; (2) receiving, in the computing device, a salt value; (3) receiving, in the computing device, a pepper value; (4) randomly generating, in the computing device, a temporary, random fry value; and/or (5) generating a hashed fried password, by one or more computer processors applying a hashing function to (i) the password value, salt value, pepper value, and/or the random fry value, or (ii) the password value after it is modified or appending by the salt value, pepper value, and/or temporary, random fry value to facilitate maintaining password secrecy and secure communications. The random fry value may not be saved or otherwise permanently stored in a local or remote memory unit, and/or the method may include deleting or erasing the random fry value after the hashed fried password is generated to prevent any possibility of a hacker gaining knowledge of the fry value or key. The method may include additional, less, or alternate actions, including those discussed elsewhere herein.

In another aspect, a computer system configured to enhance password security may be provided. The computing system may include one or more processors; and one or more memories storing instructions that, when executed by the one or more processors, cause the computing system to (1) receive, in a computing device, a password value of a user; (2) receive, in the computing device, a salt value; (3) receive, in the computing device, a pepper value; (4) randomly generate, in the computing device, a temporary fry value; and/or (5) generate a hashed fried password, by one or more computer processors applying a hashing function to (i) the password value, salt value, pepper value, and/or the temporary fry value, or (ii) the password value after it is modified or appending by the salt, pepper, and/or temporary fry values to facilitate maintaining password secrecy and secure communications. The system may include additional, less, or alternate functionality, including that discussed elsewhere herein.

In another aspect, a computer-implemented method for creating a hashed fried password or enhancing password security may be provided. The method may include (1) receiving, in a computing device, a password of a user; (2) retrieving or receiving, in the computing device, a salt key; (3) retrieving or receiving, in the computing device, pepper key; (4) generating, by a computer processor accessing a random number generator, a temporary fry key; (5) generating a fried password by a computer processor combining the password, the salt key, the pepper key, and/or the temporary fry key, or otherwise modifying or appending the password with the salt key, the pepper key, and/or the temporary fry key; and/or (6) generating a hashed fried password, by a computer processor applying a hashing function to the fried password to facilitate maintaining password secrecy and secure communications. The temporary, random fry value may not be saved or otherwise permanently stored in a local or remote memory unit, and/or the method may include affirmatively or explicitly deleting or erasing the temporary, random fry value after the fried password or the hashed fried password is generated to prevent attackers learning the value of the fry value or key. The method may include additional, less, or alternate actions, including those discussed elsewhere herein.

In another aspect, a computing system configured to enhance password security may be provided. The system may include one or more processors; and one or more memories storing instructions that, when executed by the one or more processors, cause the computing system to (1) receive, in a computing device, a password of a user; (2) receive or retrieve (such as from a local or remote memory unit), in the computing device, a salt key; (3) receive or receive (such as from a local or remote memory unit), in the computing device, a pepper key; (4) randomly generate (such as locally), in the computing device, a temporary, random fry key; (5) modify, in the computing device, the password using the salt key, pepper key, and/or temporary, random fry key to create a fried password (such as by appending or otherwise modifying the password with the salt key, pepper key, and/or random fry key); and/or (6) generate a hashed fried password, by one or more computer processors applying a hashing function to (i) the fried password, and/or (ii) the password, salt key, pepper key, and the temporary, random fry key to facilitate maintaining password secrecy and secure communications. The instructions may further cause the computing system to delete or erase the temporary, random fry key once the fried password is hashed to facilitate preventing attackers from learning a value of the random fry key, or otherwise not save or otherwise store the temporary, random fry key once the fried password is hashed to facilitate preventing attackers from learning a value of the temporary, random fry key to facilitate maintaining secrecy of the fry key. The system may include additional, less, or alternate functionality, including that discussed elsewhere herein.

In another aspect, a computer-implemented method for creating a hashed fried password may be provided. The method may include (1) receiving, in a computing device, a password value of a user; (2) receiving or retrieving, in the computing device, a salt value; (3) receiving or retrieving, in the computing device, a pepper value; (4) generating, by a computer processor, a temporary, random fry value; (5) generating a fried password by a computer processor combining the password value, the salt value, the pepper value, and the temporary, random fry value; and/or (6) generating a hashed fried password, by a computer processor applying a hashing function to the fried password, to facilitate password secrecy and secure communications. The method may include additional, less, or alternative actions, including those discussed elsewhere herein.

In another aspect, a computer system configured to create and use hashed fried passwords may be provided. The computer system may include one or more processors; and/or one or more memories storing instructions that, when executed by the one or more processors, cause the computing system to (1) receive, in a computing device, a password value of a user; (2) receive or retrieve, in the computing device, a salt value; (3) receive or retrieve, in the computing device, a pepper value; (4) generate, by a computer processor, a temporary, random fry value; (5) generate a fried password by a computer processor combining the password value, the salt value, the pepper value, and the temporary, random fry value; and/or (6) generate a hashed fried password, by a computer processor applying a hashing function to the fried password, to facilitate password secrecy and secure communications. The computer system may include additional, less, or alternate functionality, including that discussed elsewhere herein.

In one aspect, a computer-implemented method for remotely authenticating a user or user mobile device using a hashed fried password may be provided. The method may include (1) receiving, such as at a remote server, a hashed fried password associated with a virtual user account, user, or user mobile device from a user mobile device. The hashed fried password may be created at the user mobile device using a temporary, random fry key. The method may also include, at the remote server, (2) receiving or retrieving a user password associated with the virtual user account, user, or user mobile device; (3) in parallel and using several processors, checking for each possible and pre-authorized fry key within a pre-approved group of several fry keys that may have been used with the user password to create the hashed fried password at the user mobile device; and/or (4) if a match exists (i.e., the fry key used at the user mobile device to create the hashed fried password is from among the group of pre-approved fry keys), then authenticating the user and/or user mobile device and allow the user online access to their virtual account via their mobile device to facilitate secure communication or online account access with minimal or no impact on customer experience.

In another aspect, a computer-implemented method of authenticating a user or user mobile device using a hashed fried password at an authenticating server may be provided. The method may include (1) receiving, at an authentication server, via wireless communication or data transmission over one or more radio frequency links or communication channels, a username sent from a user mobile device and/or a user mobile device identifier; (2) identifying, at the authentication server, a virtual user account associated with a user using the username and/or user mobile device identifier; (3) receiving, at the authentication server, a hashed fried password associated with the virtual user account or user from the user mobile device via wireless communication or data transmission; (4) retrieving, via the authentication server, a user password associated with the virtual user account from a memory unit, or receiving the user password from the user mobile device via wireless communication or data transmission; and/or (5) directing, via the authentication server, several local or remote processors in parallel to reverse engineer a fry key or value from the hashed fried password to authenticate the user and/or user mobile device to facilitate secure authentication with minimal or no impact on the customer experience.

In another aspect, a computer-implemented method of authenticating a user or user mobile device using a hashed fried password at an authenticating server may be provided. The method may include (1) receiving, at an authentication server, via wireless communication or data transmission over one or more radio frequency links or communication channels, a username sent from a user mobile device and/or a user mobile device identifier; (2) identifying, at the authentication server, a virtual user account associated with a user using the username and/or user mobile device identifier; (3) receiving, at the authentication server, a hashed fried password associated with the virtual user account or user, such as from the user mobile device; (4) retrieving, via the authentication server, a user password associated with the virtual user account from a memory unit, or receiving from the user mobile device the user password; (5) in parallel, over several processors, such as under the direction of the authentication server, checking for each possible and pre-authorized fry value or key within a pre-approved group of several fry values or keys; and/or (6) when a match for the fry key used at the mobile device to create the hashed fried password is found or determined, via the authentication server, authenticating the user or user mobile device, and allowing the user online access to their virtual account via their mobile device to facilitate secure communication with minimal or no impact on customer experience.

In another aspect, a computer-implemented method for remote authentication to facilitate password secrecy and secure communications may be provided. The method may include (1) receiving, at a remote server, a username value and password value of a user from a user mobile device, such as via wireless communication or data transmission over one or more radio frequency links or communication channels; (2) receiving, at the remote server, a hashed fried password value associated with the user from the user mobile device, such as via wireless communication or data transmission over one or more radio frequency links or communication channels; (3) generating a set of candidate hashes at the remote server by one or more computer processors applying, for each respective fry value in a set of fry values, a hashing function to, at least, the each respective fry value and the password value; (4) determining, at the remote server, whether or not the hashed fried password value appears within the set of candidate hashes; and/or (5) if so, at the remote server, allowing the user to access their virtual account via their mobile device to facilitate secure communication and authentication.

In another aspect, a computer-implemented method for remote authentication to facilitate password secrecy and secure communications may be provided. The method may include (1) receiving, in a mobile computing device, a username value and password value of a user; (2) receiving, in the mobile computing device, a hashed fried password value, salt value, and pepper value, wherein each of the hashed fried password value, salt value, and pepper value is associated with the user; (3) generating a set of candidate hashes in the mobile computing device by one or more computer processors applying, for each respective fry value in a set of fry values, a hashing function to the each respective fry value, the password value, the salt value, and the pepper value; (4) determining, by a computer processor, an authentication state indicating whether or not the hashed fried password value appears within the set of candidate hashes; and/or (5) transmitting, via a communication network, the authentication state to facilitate online authentication. The foregoing methods may include additional, less, or alternate actions, including those discussed elsewhere herein.

ADDITIONAL CONSIDERATIONS

With the foregoing, any users (e.g., insurance customers) whose data is being collected and/or utilized may first opt-in to a rewards, insurance discount, or other type of program. Of course, the described techniques of secure hashing described herein may have the primary benefit of securing personal or private customer data.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for creating a hashed fried password through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for creating a hashed fried password in a computing device, comprising:
   receiving a password value of a user;
   receiving a global pepper value;
   receiving a set of fry values;
   generating, via a random number generator, a salt value;
   selecting at least one fry value from the set of fry values;
   generating a fried password by combining the password value, the salt value, the global pepper value, and the at least one fry value;
   applying a hashing function to the fried password to generate a hashed fried password; and
   authenticating the user when the hashed fried password value appears within a set of candidate hashes.

2. The computer-implemented method of claim 1, further comprising:
   storing the hashed fried password and the salt value in association with the user.

3. The computer-implemented method of claim 1, further comprising:
   specifying an adjustable work factor as a parameter of the hashing function.

4. The computer-implemented method of claim 1, further comprising:
   selecting the hashing function a plurality of hashing functions.

5. The computer-implemented method of claim 1, wherein the hashing function is a cryptographic hash function.

6. A computer-implemented method for authenticating a hashed fried password at a computing device, comprising:
   receiving a password value of a user;
   receiving a global pepper value;
   receiving a set of fry values;
   receiving a hashed fried password value and salt value associated with the user;
   applying a hashing function to the password value, salt value, global pepper value, and each of the set of fry values to generate a hashed fried password; and
   authenticating the user when the hashed fried password value appears within a set of candidate hashes.

7. The computer-implemented method of claim 6, further comprising:
   transmitting, in response to authenticating the user, an indication to a remote computing device.

8. The computer-implemented method of claim 6, wherein the remote computing device is a mobile computing device of a user.

9. The computer-implemented method of claim 6, further comprising:
   generating a portion of the set of candidate hashes in parallel using one or both of (i) an application-specific integrated circuit (ASIC), and (ii) a graphics processing unit (GPU).

10. The computer-implemented method of claim 6, further comprising:
    selecting an updated fry value from the set of fry values;
    combining the password value, the salt value, the global pepper value, and the updated fry value to generate an updated fried password;
    applying a hashing function to the updated fried password to generate an updated hashed fried password; and
    storing the updated hashed fried password and the salt value in association with the user.

11. The computer-implemented method of claim 10, further comprising:
    applying a cryptographic hash function.

12. The computer-implemented method of claim 6, further comprising:
    receiving the password value via an HTML form.

13. The computer-implemented method of claim 6, further comprising:
    validating the password value of the user.

14. A computing system comprising:
    one or more processors; and
    one or more memories storing instructions that, when executed by the one or more processors, cause the computing system to
    receive a password value of a user;
    receive a global pepper value;
    receive a set of fry values;
    receive a hashed fried password value and salt value associated with the user;
    apply a hashing function to the password value, salt value, global pepper value, and each of the set of fry values to generate a set of candidate hashes; and
    authenticate the user when the hashed fried password value appears within the set of candidate hashes.

15. The computing system of claim 14, wherein the instructions further cause the computing system to:
    transmit, in response to authenticating the user, an indication to a remote computing device.

16. The computing system of claim 14, wherein the remote computing device is a mobile computing device of a user.

17. The computing system of claim 14, wherein the instructions further cause the computing system to:
    generate a portion of the set of candidate hashes in parallel using one or both of (i) a graphics processing unit (GPU), and (ii) an application-specific integrated circuit (ASIC).

18. The computing system of claim 14, wherein the instructions further cause the computing system to:
    select an updated fry value from the set of fry values;
    combine the password value, the salt value, the global pepper value, and the updated fry value to generate an updated fried password; and
    apply a hashing function to the updated fried password to generate an updated hashed fried password; and
    store the updated hashed fried password and the salt value in association with the user.

19. The computing system of claim 18, wherein the instructions further cause the computing system to:
    apply a cryptographic hashing function to generate the updated hashed fried password.

20. The computing system of claim 14, wherein the instructions further cause the computing system to:
    receive the password value via an HTML form.

21. A computer-implemented method of authenticating a user, comprising:
    receiving a first password value of the user;
    transmitting, to a remote computing device, the first password value of the user;
    receiving a fry value;
    storing the fry value securely;
    receiving a second password value of the user;
    transmitting, to the remote computing device, the second password value of the user, a pepper value, a salt value, and the securely-stored fry value;

receiving authentication information;
applying a hashing function to a password value including the second password value, the pepper value, the salt value and the securely-stored fry value, to generate a hashed fried password; and
authenticating the user when the hashed fried password value appears within a set of candidate hashes.

\* \* \* \* \*